United States Patent
Karaoguz

(10) Patent No.: US 9,307,573 B2
(45) Date of Patent: *Apr. 5, 2016

(54) PROVIDING LINK QUALITY INTELLIGENCE FROM PHYSICAL LAYER TO HIGHER PROTOCOL LAYERS

(75) Inventor: Jeyhan Karaoguz, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1061 days.

This patent is subject to a terminal disclaimer.

(21) Appl. No.: 12/753,965

(22) Filed: Apr. 5, 2010

(65) Prior Publication Data

US 2010/0189009 A1 Jul. 29, 2010

Related U.S. Application Data

(63) Continuation of application No. 10/668,653, filed on Sep. 23, 2003, now Pat. No. 7,697,448.

(60) Provisional application No. 60/460,350, filed on Apr. 3, 2003, provisional application No. 60/472,336, filed on May 21, 2003, provisional application No. 60/473,776, filed on May 28, 2003, provisional application No. 60/475,661, filed on Jun. 4, 2003.

(51) Int. Cl.
| | |
|---|---|
| *G01R 31/08* | (2006.01) |
| *H04W 84/12* | (2009.01) |
| *H04L 1/20* | (2006.01) |
| *H04W 28/18* | (2009.01) |

(Continued)

(52) U.S. Cl.
CPC .............. *H04W 84/12* (2013.01); *H04L 1/20* (2013.01); *H04W 28/18* (2013.01); *H04W 64/00* (2013.01); *H04W 84/18* (2013.01)

(58) Field of Classification Search
USPC .............. 370/252, 328, 338, 401, 465, 469
See application file for complete search history.

(56) References Cited

U.S. PATENT DOCUMENTS 6,940,823 B1 *  9/2005  Park et al. .............. 370/252
7,123,628 B1 * 10/2006  Hwang et al. ........... 370/252

(Continued)

OTHER PUBLICATIONS

Bluetooth—Connect Without Cables; Pub. 2011, XP2471968, 24 pages.

(Continued)

*Primary Examiner* — Ricky Ngo
*Assistant Examiner* — Christine Ng
(74) *Attorney, Agent, or Firm* — Garlick & Markison; Shayne Short

(57) ABSTRACT

Providing link quality intelligence from physical layer to higher protocol layers. The PHY (physical layer) of devices operating within wireless communication systems assess 1 or more operational parameters corresponding to a PHY link that communicatively couples 2 or more devices. These PHYs provide this assessed intelligence to the devices' higher protocol layers so that these higher protocol layers have greater visibility of the operational parameters of the PHY link. These higher protocol layers may use this assessed intelligence to make decisions about how future communication are governed across the PHY links. For example, based on a change of the operational parameter(s), the higher protocol layers may modify the operational parameter(s) for future communications. The higher protocol layers may direct the PHY to assess a particular set of operational parameters, and the higher protocol layers may assess different operational parameters at different times.

26 Claims, 15 Drawing Sheets providing link quality intelligence from physical layer to higher protocol layers

(51) Int. Cl.
*H04W 64/00* (2009.01)
*H04W 84/18* (2009.01)

(56) References Cited

U.S. PATENT DOCUMENTS 7,333,814 B2 * 2/2008 Roberts ............... 455/452.2
7,447,163 B1 * 11/2008 Thomson et al. ............ 370/252
7,474,686 B2 * 1/2009 Ho ............... 375/132
7,697,448 B2 * 4/2010 Karaoguz ............... 370/252

OTHER PUBLICATIONS

European Search Report for EP Application No./Patent No. 04003649.3—1249, dated Feb. 2, 2011.

* cited by examiner

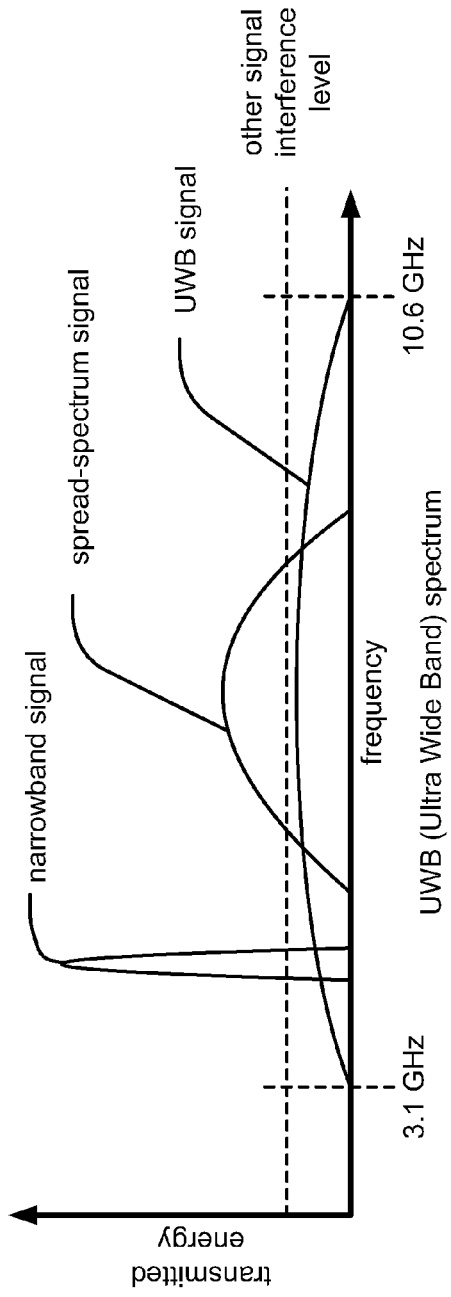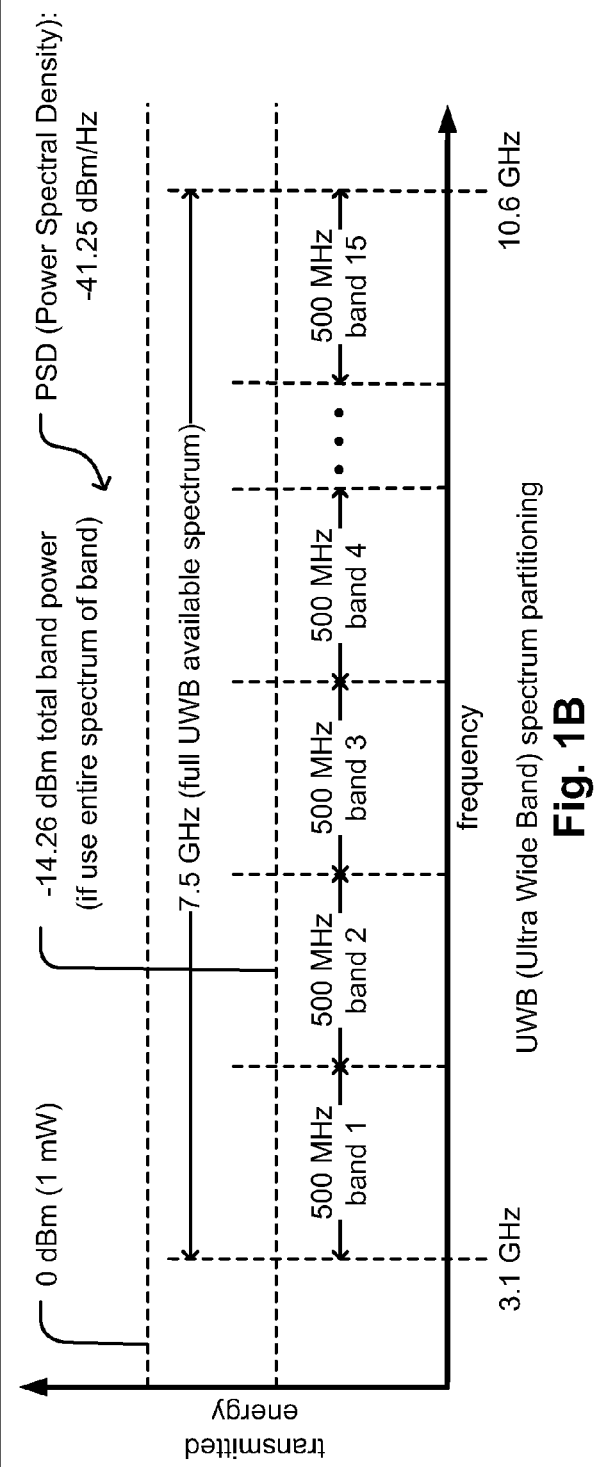

piconet (shown in wireless communication system embodiment)

CDMA (Code Division Multiple Access)

MAC (Medium Access Controller) directed device interaction with network

PNC direction operation of DEVs within piconet

PROVIDING LINK QUALITY INTELLIGENCE FROM PHYSICAL LAYER TO HIGHER PROTOCOL LAYERS

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 10/668,653, entitled "Providing line quality intelligence from physical layer to higher protocol layers," filed Sep. 23, 2003, and scheduled to be issued as U.S. Pat. No. 7,697,448 on Apr. 13, 2010, which claims priority pursuant to 35 U.S.C. §119(e) to the following U.S. Provisional Patent Applications which are hereby incorporated herein by reference in their entirety and made part of the present U.S. Utility patent application for all purposes:
   a. U.S. Provisional Application Ser. No. 60/460,350, entitled "Independent piconet coexistence and operation using combined modulation and time-frequency interleaving," filed Apr. 3, 2003.
   b. U.S. Provisional Application Ser. No. 60/472,336, entitled "Position based WPAN (Wireless Personal Area Network) management," filed May 21, 2003.
   c. U.S. Provisional Application Ser. No. 60/473,776, entitled "UWB (Ultra Wide Band) waveform design to minimize narrowband interference," filed May 28, 2003.
   d. U.S. Provisional Application Ser. No. 60/475,661, entitled "Providing link quality intelligence from physical layer to higher protocol layers within wireless networks," filed Jun. 4, 2003.

INCORPORATION BY REFERENCE

The following U.S. Utility patent applications/patents are hereby incorporated herein by reference in their entirety and made part of the present U.S. Utility patent application for all purposes:
1. U.S. Utility patent application Ser. No. 10/668,527, entitled "Position based WPAN (Wireless Personal Area Network) management," filed Sep. 23, 2010, now U.S. Pat. No. 7,668,124, issued on Feb. 23, 2010.
2. U.S. Utility patent application Ser. No. 10/668,648, entitled "UWB (Ultra Wide Band) waveform design to minimize narrowband interference," filed Sep. 23, 2010, now U.S. Pat. No. 7,554,965, issued on Jun. 30, 2009.

BACKGROUND OF THE INVENTION

1. Technical Field of the Invention

The invention relates generally to communication systems; and, more particularly, it relates to assessment of operational parameters and management thereof within such communication systems.

2. Description of Related Art

Data communication systems have been under continual development for many years. In recent years, the development of piconet type communication systems has been under increasing development. A piconet may be viewed as a network that is established when two devices connect to support communication of data between themselves. Sometimes, piconets are referred to as PANs (Personal Area Networks). These piconets typically operate within a region having a radius of up to approximately 10 meters.

As is known, the Bluetooth® communication standard is the first such PAN communication standard that has been developed. In accordance with the Bluetooth® communication standard, the communication between the various devices in such a piconet is strictly performed using an M/S (Master/Slave) configuration. Each of the devices within such a Bluetooth® piconet is M/S capable. Typically one of the devices (sometimes referred to as piconet controller in this situation), or a first device within the Bluetooth® piconet, transmits a beacon signal (or an access invitation signal) while operating as the "master" device of the Bluetooth® piconet to the other "slave" devices of the Bluetooth® piconet. In other words, the "master" device of the Bluetooth® piconet polls the other "slave" devices to get them to respond.

However, other piconets may be implemented such that the devices do not operate according to such an M/S (Master/Slave) type relationship. In such instances, various piconet operable devices operate may be referred to as PNCs (piconet coordinators) and DEVs (user piconet devices that are not PNCs). The PNCs operate to coordinate the communication between themselves and the DEVs within the piconet. Sometimes, such a PNC may be implemented to operate as a master with respect to the 1 or more DEVs that operate as slaves, but this need not be the case in all instances—the strict M/S relationship is typically the case only in a Bluetooth® piconet.

In even some other instances, two or more piconets operate cooperatively such that at least two piconets operate such that they share at least one common device in a scatternet implementation. For example, in a scatternet, a single DEV may interact with two or more PNCs. This implementation will allow various devices within different piconets that are located relatively far from one another to communicate through the PNCs of the scatternet. However, within a scatternet implementation, a problem may arise such that each of the individual piconets must be able to operate in relative close proximity with other piconets without interfering with one another. This inherently requires a great deal of synchronization between the piconets, which may be very difficult to achieve in some instances. It is also noted that independently operating piconets, not implemented within a scatternet implementation, may also suffer from deleterious effects of interference with other piconets located within relative close proximity.

Some PAN communication standards and recommended practices have been developed (and some are still being developed) by the IEEE (Institute of Electrical & Electronics Engineers) 802.15 working group. These standards and recommended practices may generally be referred to as being provided under the umbrella of the IEEE 802.15 working group. Perhaps the most common standard is the IEEE 802.15.1 standard which adopts the core of Bluetooth® and which generally can support operational rates up to approximately 1 Mbps (Mega-bits per second).

The IEEE 802.15.2 recommended practice specification has been developed in an effort to support the co-existence of the IEEE 802.15.1 Bluetooth® core with virtually any other wireless communication system within the approximate 2.4 GHz (Giga-Hertz) frequency range. As some examples, the IEEE 802.11a and IEEE 802.11g WLAN (Wireless Local Area Network) standards both operate within the approximate 2.4 GHz frequency range. This IEEE 802.15.2 recommended practice specification has been developed to ensure that such a WLAN and a piconet may operate simultaneously within relatively close proximity of one another without significant interference with one another.

In addition, the IEEE 802.15.3 high data rate PAN standard has been developed in an effort to support operational rate up to approximately 55 Mbps. In this IEEE 802.15.3 standard, the PNCs and DEVs do not operate according to an M/S relationship as they do according to Bluetooth®. In contradistinction, a PNC operates generally as an AP (Access Point) and manages the various DEVs such that they are guaranteed to perform their respective communication according to their appropriate time slots thereby ensuring proper performance and operation within the piconet. An extension of the IEEE 802.15.3 high data rate PAN standard is the IEEE 802.15.3 WPAN (Wireless Personal Area Network) High Rate Alternative PHY Task Group 3a (TG3a). This is sometimes referred to the IEEE 802.15.3a extended high data rate PAN standard, and it can support operational rates up to 480 Mbps Yet another standard developed by the IEEE 802.15 working group is the IEEE 802.15.4 low data rate PAN standard that generally supports data rates within the range of approximately 10 kbps (kilo-bits per second) and 250 kbps.

Between various devices within a piconet, a PHY (physical layer) link communicatively couples the PHY of a first device to a PHY of a second device. Various operational parameters govern the manner in which communication is performed across the PHY link. Examples of the operational parameters may include the modulation employed to map symbols to be transmitted across the PHY link (e.g., BPSK (Binary Phase Shift Key), QPSK (Quadrature Phase Shift Key), 16 QAM (16 Quadrature Amplitude Modulation), etc.), the code rate of an encoded signal that is transmitted across the PHY link, the data rate of a signal that is transmitted across the PHY link, a QoS (Quality of Service) of the PHY link, or some other operational parameter of the PHY link. Within prior art communication systems, there is typically not a great deal (if any at all) of signaling and/or communication between the PHY and higher protocol layers of information corresponding to these operational parameters by which the PHY link is supported between devices.

As such, the PHY itself is typically solely responsible for the manner in which communication is supported across its respective PHY link. This prior art implementation presents a relatively rigid manner in which to operate a piconet, in that, the PHY itself does not possess sufficient processing capability or resources to determine whether or not the operational parameters that support communication across a PHY link is a most efficient implementation or whether or not a change in the operational parameters that support communication across a PHY link would provide any improvement in performance of communication across the PHY link. For at least these deficiencies existent within the art, there is a need to provide a solution for more efficient manner to manage and control the operational parameters that govern communication across a PHY link.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 1A is a diagram illustrating an embodiment of the frequency spectrum of a UWB (Ultra Wide Band) signal when compared to some other signal types according to the invention.

FIG. 1B is a diagram illustrating an embodiment of UWB (Ultra Wide Band) spectrum partitioning into a plurality of sub-bands according to the invention.

DETAILED DESCRIPTION OF THE INVENTION

FIG. 1A is a diagram illustrating an embodiment of the frequency spectrum of a UWB (Ultra Wide Band) signal when compared to some other signal types according to the invention. In contradistinction to RF (Radio Frequency) communications that operate by using a narrowband frequency carrier to transmit information, UWB communications operate by sending pulses of energy across a broad frequency spectrum. For example, an RF signal may be viewed as occupying the range of spectra of a narrowband frequency. Also, in contradistinction to a spread-spectrum signal whose PSD (Power Spectral Density) generally rises above the PSDs of other interfering signals within an available spectrum and also occupies a relatively narrower portion of the available spectrum, a UWB signal may actually be viewed as being a pulse shaped signal (that may never exceed the PSDs of other interfering signals within the available spectrum). A spread-spectrum signal may be viewed a signal that occupies a frequency band that is much wider than the minimum bandwidth required by the information signal. For example, a transmitter "spreads" the energy (that is typically originally concentrated in narrowband) across a wider frequency band. One benefit of a spread-spectrum signal is that it provides increased immunity with respect to narrowband interference. A narrowband signal will not fully obliterate the UWB signal because of the much wider bandwidth of the UWB signal. It is also important to note that a UWB signal may also be characterized as a function of time, not frequency.

FIG. 1B is a diagram illustrating an embodiment of UWB (Ultra Wide Band) spectrum partitioning into a plurality of sub-bands according to the invention. Relatively recently, the FCC (Federal Communications Commission) has defined the available spectrum for UWB communications as being between 3.1 GHz (Giga-Hertz) and 10.6 GHz. In addition, the FCC defined the minimum spectral width of any UWB signal within the available UWB spectrum to be 500 MHz (Mega-Hertz).

Moreover, this FCC definition allows for a PSD across the UWB spectrum of −41.25 dBm/MHz of bandwidth. As a reminder, 0 dBm is the decibel (dB) measure of power of a signal referenced to 1 mW (milli-Watt). This means that the total power that may be employed by a UWB signal is approximately −14.26 dBm in any individual 500 MHz sub-band within the entire available UWB bandwidth of 7.5 GHz. In addition, if a pulse is sent using the entire 7.5 GHz of available UWB bandwidth, then the total transmitted power of a UWB signal is approximately −2.5 dBm.

Figure 2A:
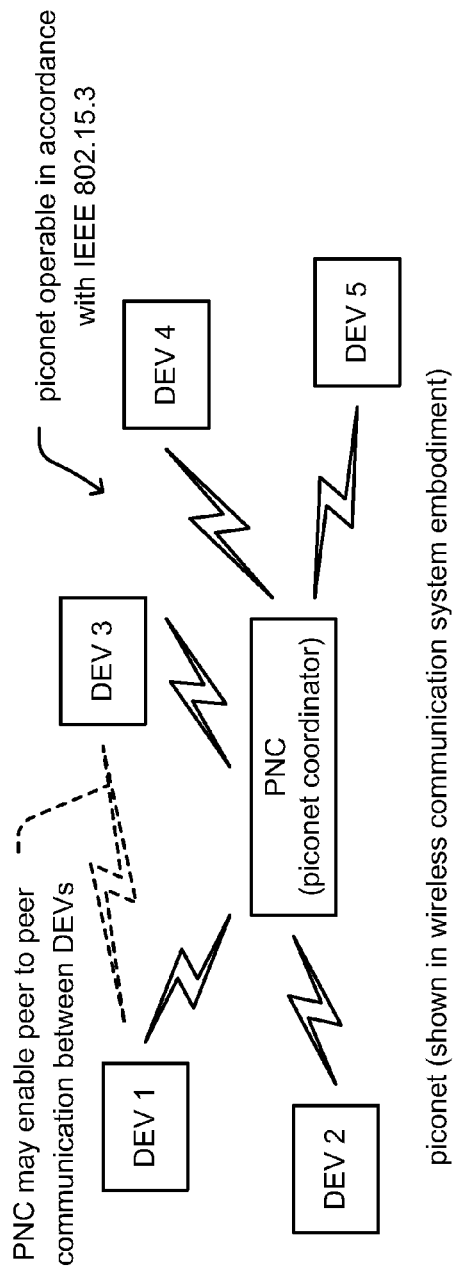
FIG. 2A is a diagram illustrating an embodiment of a piconet (shown as a wireless communication system) that is built according to the invention.

FIG. 2A is a diagram illustrating an embodiment of a piconet (shown as a wireless communication system) that is built according to the invention. As described briefly above, a piconet may be viewed as being the network that is established when any two devices connect to support communication between them. The piconet may be implemented using a PNC (piconet coordinator) and 1 or more DEVs (piconet devices). In some instances, the DEVs do not communication directly with one another, but with each other through the PNC.

To support communication between each of the DEVs, simultaneously at some times, and the PNC, the communication must be implemented in such a way that the communication links between each DEV and the PNC will not interfere with the other communication links in any other SOP (Simultaneously Operating Piconet) within a relatively close proximity. That is to say, when two or more piconets operate within relatively close proximity to one another, the communication within each of the respective piconets must be implemented in such a way that simultaneously operation of the two or more piconets (e.g., the coexistence and operation) may be performed without interfering with one another. It is also noted that the PNC may also operate to enable p2p (peer to peer) communication between two DEVs within a piconet. Moreover, the piconet in this embodiment, as well as within other embodiments described herein are operable in accordance with the constraints provided by the IEEE 802.15.3a standard and may also be implemented such that the piconet is operable in accordance with other wireless communication standards as well.

Figure 2B:
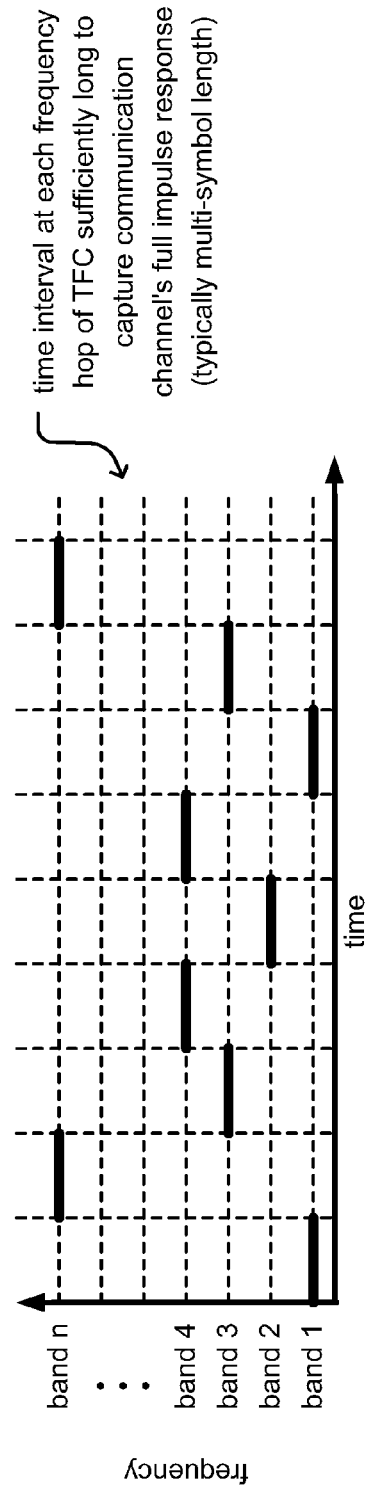
FIG. 2B is a diagram illustrating an embodiment of a TFC (time frequency code) (having a period) that may be employed according to the invention.

FIG. 2B is a diagram illustrating an embodiment of a TFC (time frequency code) (having a period) that may be employed according to the invention. As a function of time, the frequency band that is being used will "hop" from one frequency band to another according to the TFC. The use of a TFC is one means of operation that may be used to make a communication channel more robust. For example, when noise, such as background noise, is relatively localized to a particular portion of the spectrum, the TFC will help minimize the deleterious effects this frequency specific and frequency localized noise.

Frequency hopping may be viewed as a periodic switching of the frequency of a signal during transmission. In a communication system, a transmitter and a receiver operate in synchronization so that each operates at the same frequency at any given time. In this particular embodiment, an available frequency spectrum is sub-divided into n bands. The communication operates using a band 1 during a first time interval, then operates using a band n during a second time interval, then operates using a band 3 during a third time interval, and so on as indicated in the diagram.

It is also noted that the time interval between the various frequency hops is sufficiently long so as to permit the capture of a communication channel's full impulse response. This time interval at which the communication system operates at any given frequency will typically be multi-symbol lengths in duration.

As an example of the operation of frequency hopping, in the context a UWB signal, the UWB spectrum may be divided into 15 sub-bands of 500 MHz bandwidth, the frequency hopping may be viewed as hopping between the various 500 MHz bandwidth sub-bands as a function of time.

Figure 3:
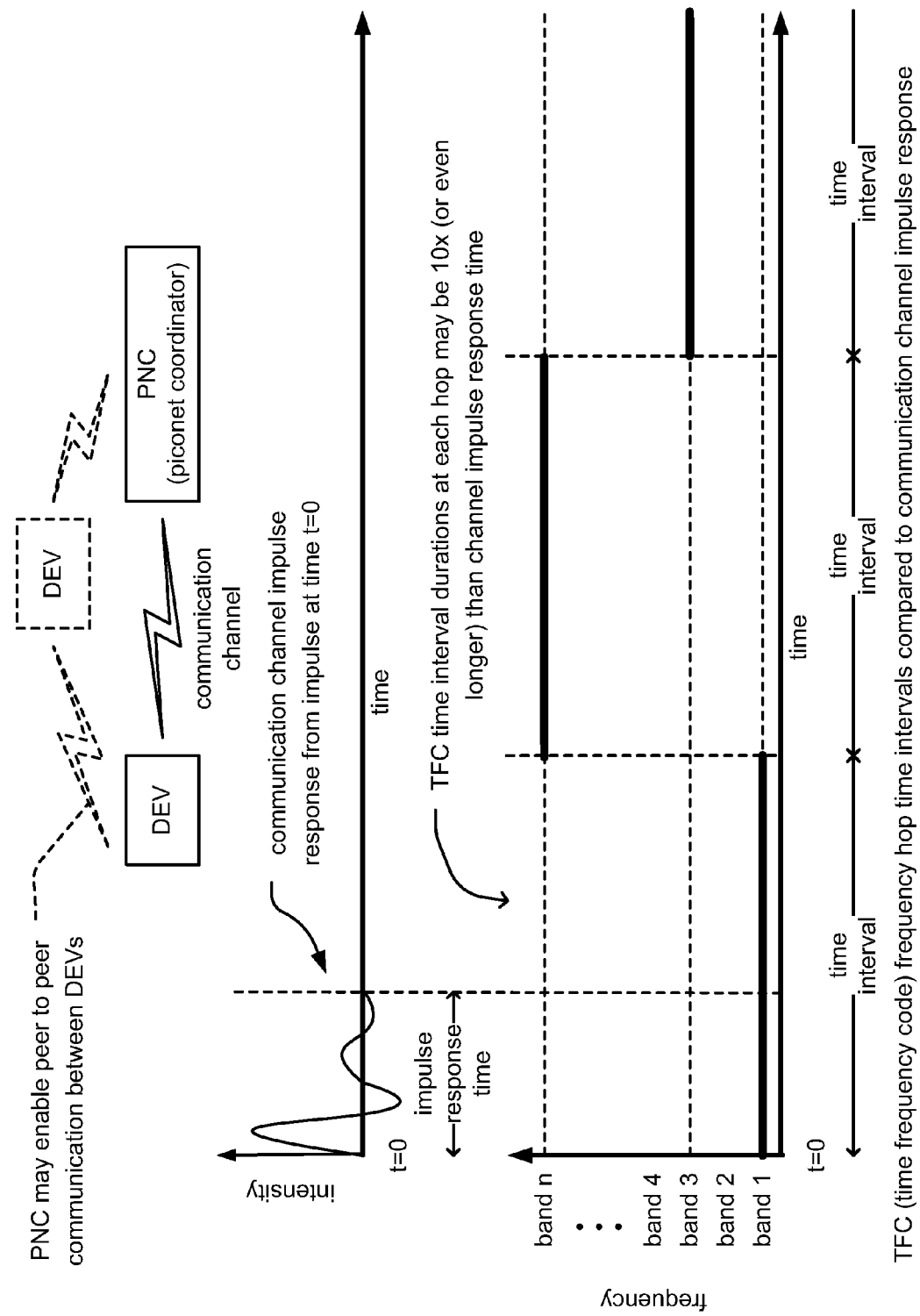
FIG. 3 is a diagram illustrating an embodiment showing TFC (time frequency code) frequency hop time intervals compared to a communication channel impulse response according to the invention.

FIG. 3 is a diagram illustrating an embodiment showing TFC (time frequency code) frequency hop time intervals compared to a communication channel impulse response according to the invention. The impulse response, as a function of time, is shown for the communication channel between two DEVs (or between a PNC and one of the DEVs). This impulse response may be viewed as the response of the communication system when an impulse is provided thereto. The impulse response varies in intensity as a function of time before dissipating. The time that the impulse response takes to dissipate completely may be viewed as the impulse response time of the communication channel.

When compared to the impulse response time of the communication channel, the TFC time interval durations at which the communication system operates using a first frequency band (shown as a band 1 during a first time interval) is much longer (e.g., substantially longer) than the impulse response time of the communication channel. In some embodiments, the TFC time interval durations are significantly longer that the impulse response time of the communication channel. As one example, the TFC time interval durations are may be up to ten times (e.g., 10×) longer than the impulse response time of the communication channel. This will allow all of the energy of a pulse to be captured when transmitted and when operating at this frequency band. Similarly, when the operation switches to another frequency band according to the TFC, then that corresponding time interval will also be longer than the impulse response time of the communication channel.

Within some prior art piconet approaches, frequency hopping alone has been implemented such that the time intervals are typically only of a single symbol's length; this is typically much shorter than the impulse response time of the communication channel. As such, much of the energy of a transmitted pulse may be lost if the frequency hops are performed too quickly. The longer duration over which the frequency hops are performed according to the invention allows for capturing of all of the energy of the transmitted pulse thereby ensuring more robust and more accurate communications. In addition, the invention provides a solution that employs combined OFDM encoding and TFC modulation of the OFDM symbols to support simultaneous operation of multiple piconets that each may include multiple DEVs.

It is again noted that a PNC enable p2p (peer to peer) communication between two separate DEVs within the piconet. The manner of communication described herein may be implemented with respect to communication between a PNC and the DEVs of the piconet and also may be implemented with respect to p2p communication between two separate DEVs within the piconet.

Figure 4:
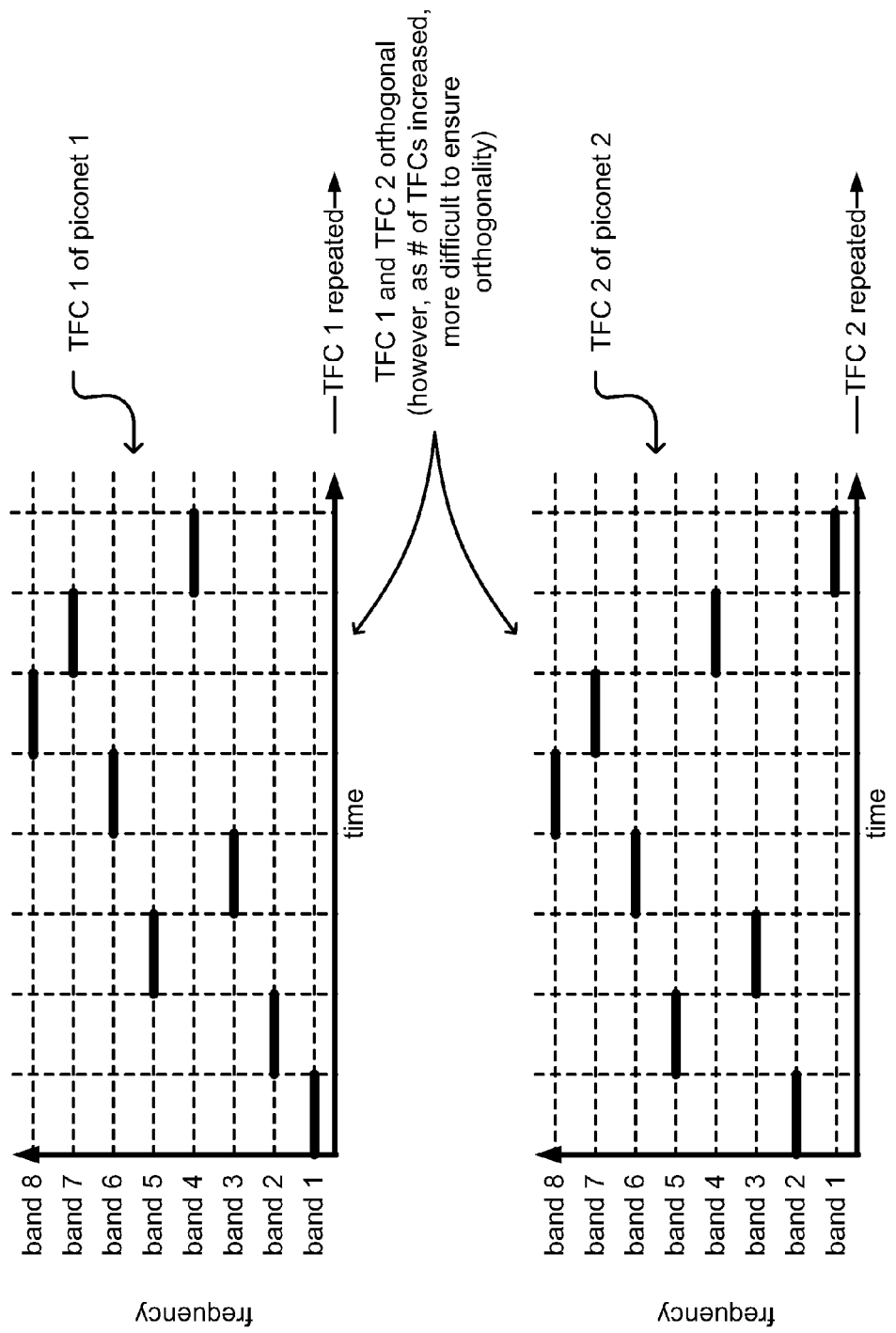
FIG. 4 is a diagram illustrating another embodiment of TFCs (time frequency codes) that may be employed according to the invention.

FIG. 4 is a diagram illustrating another embodiment of TFCs (time frequency codes) that may be employed according to the invention. This embodiment shows how two separate piconets may operate using two separate TFCs that are orthogonal to one another. However, it is also noted that as the number of TFCs employed to support communication of SOPs (Simultaneously Operating Piconets) continues to increase, and given the fact that there is a finite number of bands employed within any TFC, trying to maintain orthogonality of the TFCs will be more and more difficult. While this is possible with a small number of SOPs, it becomes impossible as the number of SOPs increases, given the inherent periodicity of the TFCs.

However, within an embodiment that employs only 2 SOPs, a piconet 1 employs a TFC 1 to support communication between the devices includes therein. In addition, a piconet 2 employs a TFC 2 to support communication between the devices includes therein. In this embodiment, during each time interval, the TFC 1 and the TFC 2 each operate using a different band. For example, when the TFC 1 operates using the band 1, the TFC 2 operates using the band 2. Similarly, when the TFC 1 operates using the band 2, the TFC 2 operates using the band 5. This orthogonal operation of the 2 TFCs continues for the duration of the operation of the respective SOPs.

Each of the respective TFCs is repeated to support subsequent operation within each of the respective piconets. This orthogonal operation of employing two TFCs allows more than one piconet to coexist in relative close proximity with one another. In addition, it is noted that each of the devices within a respective piconet will communicate with each other using the TFC that corresponds to that piconet.

Figure 5:
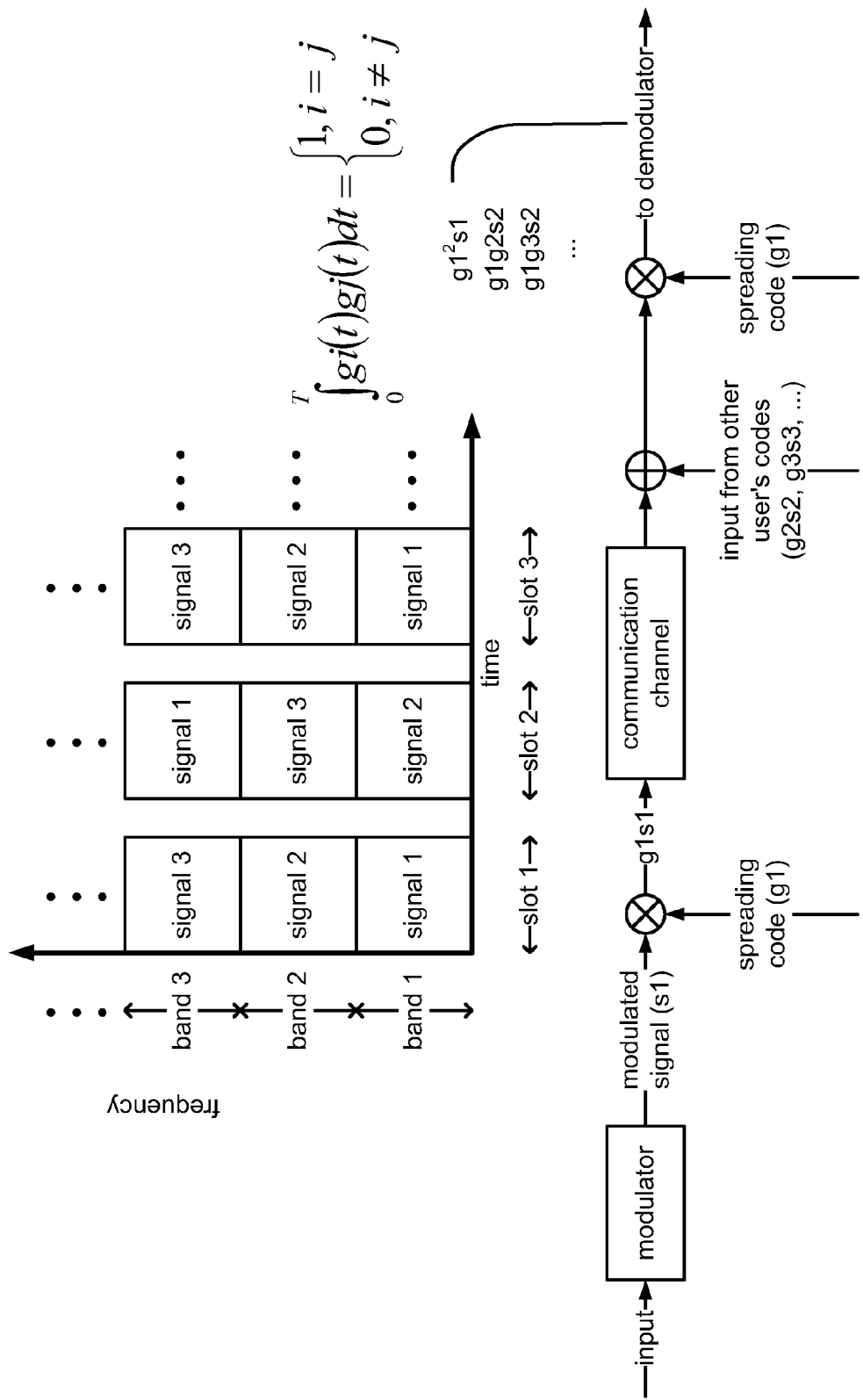
FIG. 5 is a diagram illustrating an embodiment of CDMA (Code Division Multiple Access) that may be employed according to the invention.

FIG. 5 is a diagram illustrating an embodiment of CDMA (Code Division Multiple Access) that may be employed according to the invention. CDMA may be viewed as the short term assignment of a frequency band to various signal sources. At each successive time slot, the band assignments are reordered either adaptively or according to a predetermined sequence. For example, during a time slot 1, a signal 1 operates using a band 1, a signal 2 operates using a band 2, and a signal 3 operates using a band 3. Then, during a time slot 2, the signal 1 operates using the band 3, the signal 2 operates using the band 1, and the signal 3 operates using the band 2. During a time slot 3, the signal 1 operates using the band 1, the signal 2 operates using the band 2, and the signal 3 operates using the band 3.

The operation of communication devices (e.g., users) is performed using a PN (Pseudo-Noise) code that is typically orthogonal to the other PNs codes employed by the other communication devices within the communication system. This PN code is oftentimes referred to as a spreading code. A modulated signal is spread using that spreading code and the spread signal is then transmitted across a communication channel (e.g., a PHY (physical layer) link that communicatively couples 2 devices within the piconet). At a receiver end of the communication channel, this same spreading code (e.g., this PN code) is employed to de-spread the code so that data sent from a particular device may be demodulated by the appropriate destination device.

The operation of CDMA may be better understood when viewed as the transformation of an input signal through a communication system. At a transmitter end of a communication channel, input from a particular user is first provided to a modulator where the data is modulated by a carrier thereby generating a modulated signal (s1). Next, the data-modulated signal is then multiplied by a spreading code (g1) that corresponds to that particular user thereby generating a spread signal (g1s1) that is then provided to the communication channel. This signal may be viewed as a convolution of the frequency spectrum of the modulated signal and the frequency spectrum of the spreading code. Simultaneously, input from other users within the communication system is modulated and spread in an analogous manner.

At the receiver end of the communication channel, a linear combination of all of the spread signals provided by the other users is received, e.g., g1s1+g2s2+g3s3+ ... and so on for all of the users. At the receiver end, the total received signal is then multiplied by the spreading code (g1) thereby generating a signal that includes $g1^2s1$ plus a composite of the undesired signal (e.g., g1g2s2+g1g3s3+ ... and so on).

In CDMA, the spreading codes are typically chosen such that they are orthogonal to one another. That is to say, when any one spreading code is multiplied with another spreading code, the result is zero. This way, all of the undesired signals drop out. Given that the spreading codes g1(t), g2(t), g3(t) and so on, the orthogonality of the spreading codes may be represented as follows:

$$\int_0^T gi(t)gj(t)\,dt = \begin{cases} 1, & i = j \\ 0, & i \neq j \end{cases}$$

This final signal is then passed to a demodulator where the input that has been provided at the transmitter end of the communication channel is extracted and a best estimate is made thereof.

Figure 6:
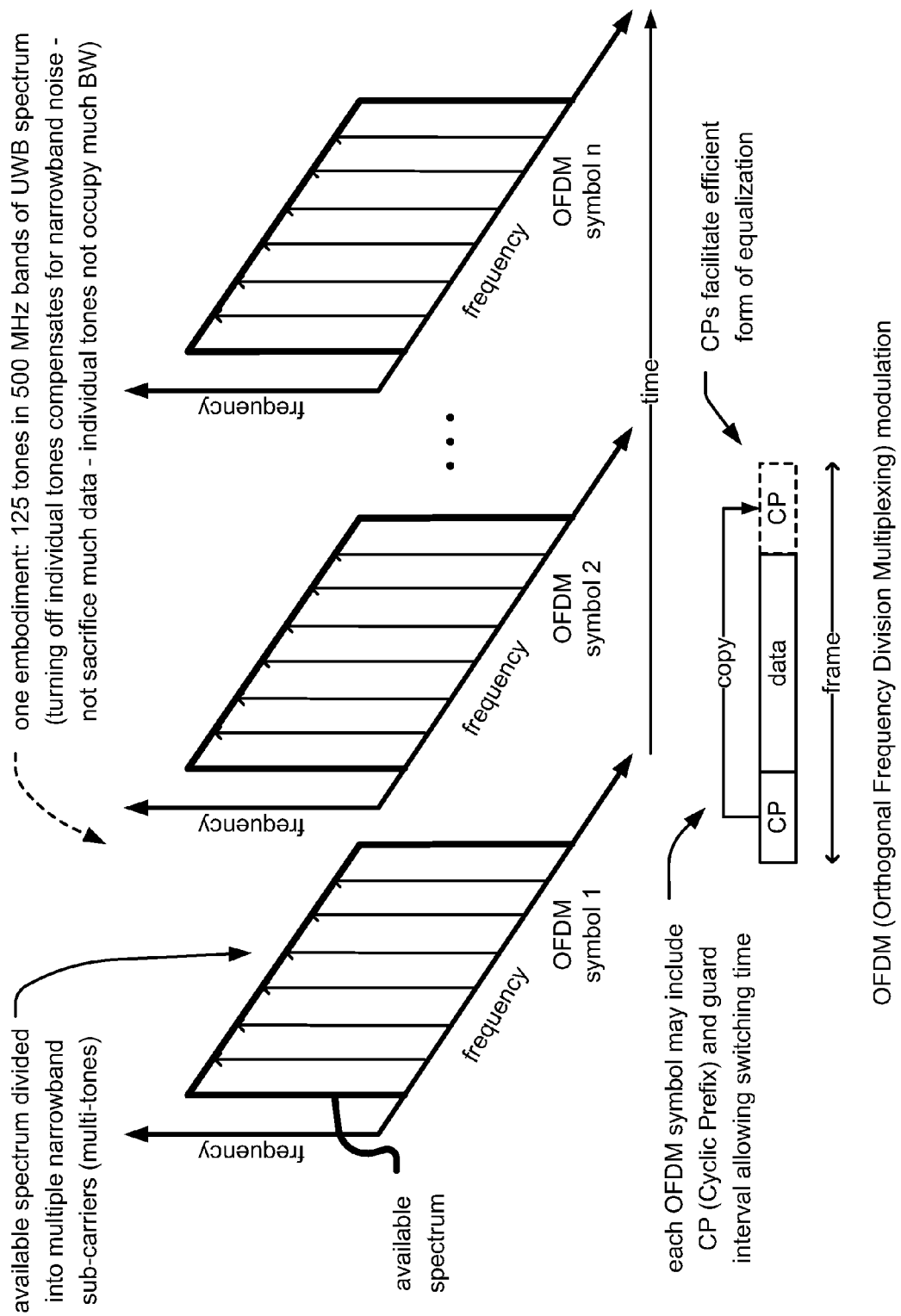
FIG. 6 is a diagram illustrating an embodiment of OFDM (Orthogonal Frequency Division Multiplexing) that may be employed according to the invention.

FIG. 6 is a diagram illustrating an embodiment of OFDM (Orthogonal Frequency Division Multiplexing) modulation that may be employed according to the invention. OFDM modulation may be viewed a dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation coding techniques.

OFDM modulation operates by performing simultaneous transmission of a larger number of narrowband carriers (or multi-tones). Oftentimes a guard interval or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols.

In one UWB embodiment, 125 OFDM tones may be implemented in any one of the 15 sub-bands of 500 MHz bandwidth within the UWB spectrum. Other benefits are achieved using OFDM. For example, the use of multi-tones allows for an effective solution to deal with narrowband interference. For example, a tone that corresponds to the locality of the narrowband interference may be turned off (to eliminate the susceptibility to this narrowband interference) and still provide for efficient operation. This turning off of these one or few tones will not result in a great loss of bandwidth because each individual tone does not occupy a great deal of bandwidth within the available spectrum employed by the OFDM symbol. Therefore, OFDM modulation provides a solution that may be employed in accordance with invention that provides link quality intelligence from the PHY (physical layer) to the higher protocol layers within devices operating within wireless networks (e.g., piconets as one example).

Figure 7:
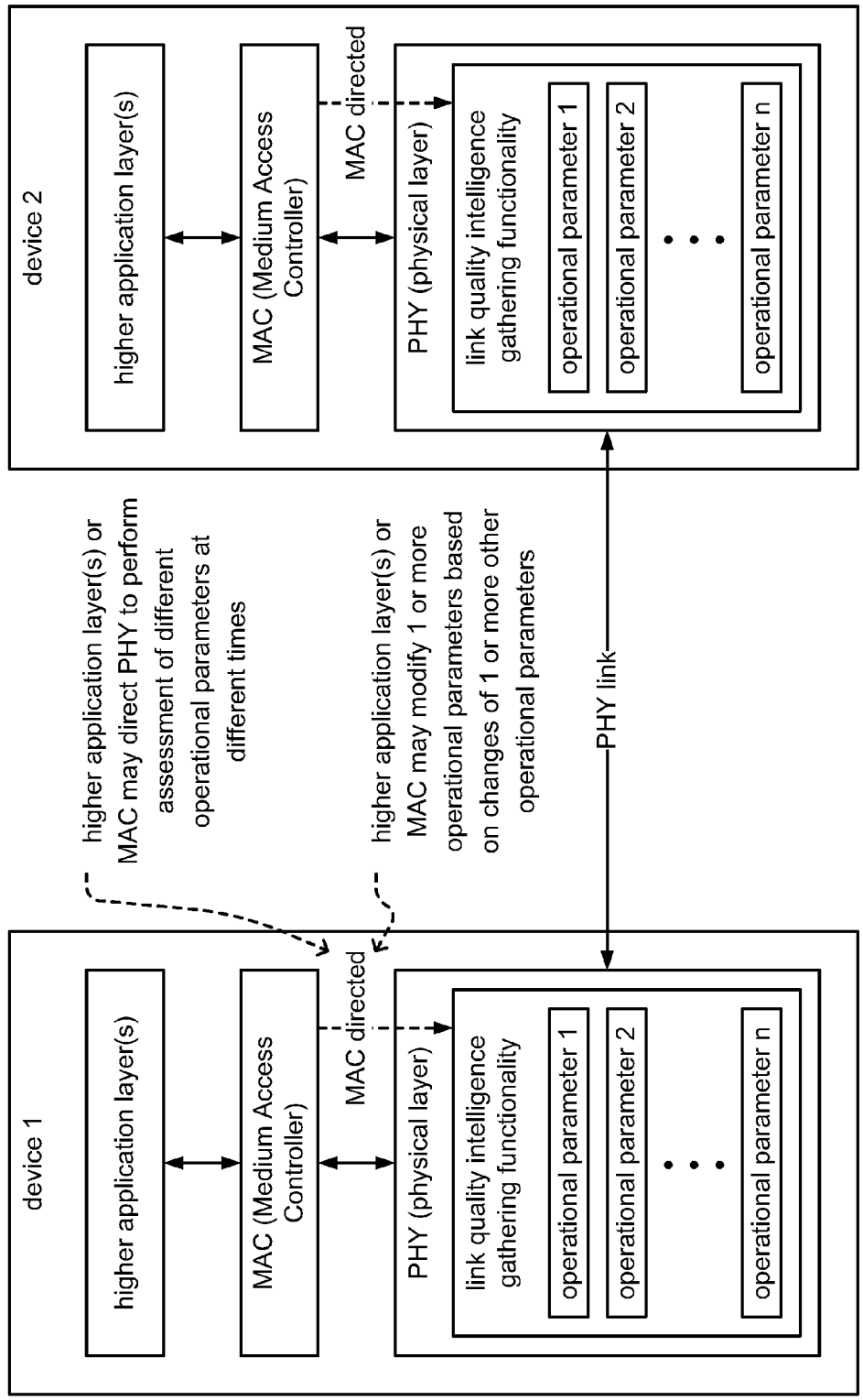
FIG. 7 is a diagram illustrating an embodiment of providing link quality intelligence from the PHY (physical layer) to higher protocol layers within a device according to the invention.

FIG. 7 is a diagram illustrating an embodiment of providing link quality intelligence from the PHY (physical layer) to higher protocol layers within a device according to the invention. Two different devices (shown as a device 1 and a device 2) operate within a piconet. Each device includes a PHY (physical layer) that communicatively couples to a MAC (Medium Access Controller). The MACs of the devices may also communicatively couple to even higher application layers within the respective devices. The MAC and the higher application layers may be viewed as being the higher protocol layers (e.g., above the PHY) within the respective devices. When compared to prior art PHY and MAC, the PHY and MAC of the devices may be viewed as being modified protocol layers, in that, the PHY includes link quality intelligence gathering functionality that is operable to assess 1 or more of the operational parameters that governs the communication of the PHY link that communicatively couples the PHYs of the 2 devices, and the MAC is operable to use this assessed intelligence of the PHY link to make decisions about how the PHY link is to be operated. This link quality intelligence gathering functionality is operable to assess the current state of these operational parameters and to provide this pure intelligence information up to the higher protocol layers of the respective device. This way, the higher protocol layers may then have access to greater amounts of information by which to make decisions concerning the operation of the PHY link that communicatively couples the 2 devices.

It is also noted that the MAC or the higher application layers (e.g., the higher protocol layers) may also direct the link quality intelligence gathering functionality of the PHY to assess a particular set of operational parameters. This higher visibility allows, for the higher protocol layers, for more intelligent control of the PHY link. The enhanced (or modified) PHY of the device is operable to assess link quality information of the PHY link and thereby allow the higher layer protocols to perform a variety of functions including accepting or denying the registration requests of devices within the network, communicating to the other devices which services are available, and/or terminating some of the services provided by the device in an effort to maintain communication or maintain a particular level of service.

Figure 8:
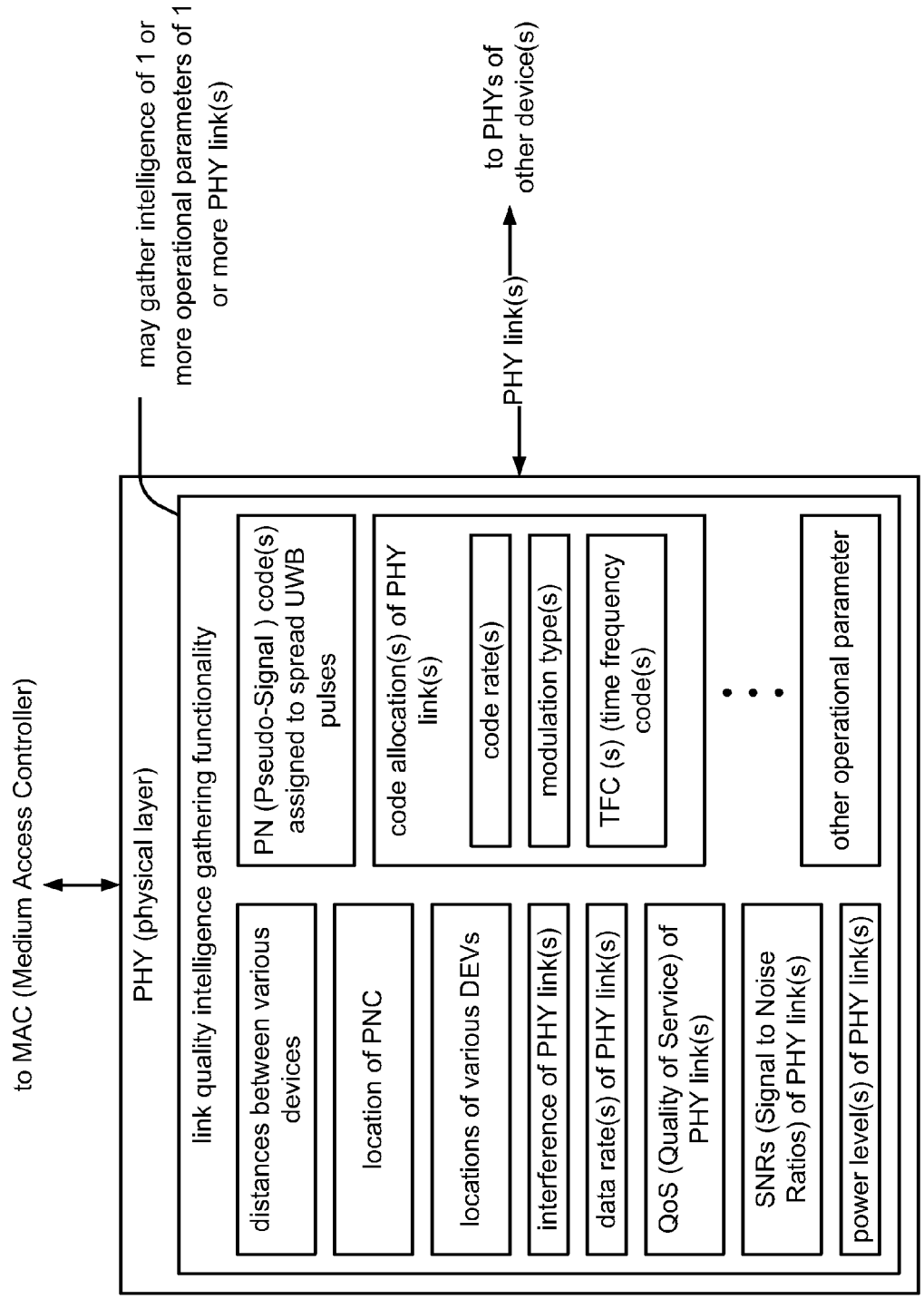
FIG. 8 is a diagram illustrating an embodiment of some operational parameters that may be provided from a PHY (physical layer) to a MAC (Medium Access Controller) according to the invention.

FIG. 8 is a diagram illustrating an embodiment of some operational parameters that may be provided from a PHY (physical layer) to a MAC (Medium Access Controller) according to the invention. The PHY described within this diagram may be viewed as being one of the PHYs described above within the description of the FIG. 7 in one embodiment. The link quality intelligence gathering functionality may be implemented to assess a wide variety of operational parameters. One example of an operational parameter that may be assesses by the link quality intelligence gathering functionality of the PHY is the distances between the various devices within the piconet. This may be performed using ranging of OFDM pulses transmitted between devices via the respective PHY link that communicatively couples the devices; using the round trip time of the OFDM pulses as well as the velocity at which the OFDM pulses travel, the corresponding distances may be determined. If desired, using triangulation, ranging may be employed using 3 devices to determine the operational parameters of either the location of a PNC (piconet coordinator) of DEVs (user piconet devices) within the piconet.

In addition, the interference of the respective PHY links may be assessed. The data rates supported by the various PHY links may be assessed. The QoS (Quality of Service) of the various PHY links may also be assessed. The SNR (Signal to Noise Ratio) of the various PHY links may also be assessed. In some embodiments, PN (Pseudo-Noise) codes may be employed spread OFDM pulses that are transmitted between devices; this may be one of the operational parameters assessed by the various PHYs within the piconet.

Other examples of operational parameters that may be assessed by the link quality intelligence gathering functionality of the PHYs of the devices may include the code allocations employed on the various PHY links that communicatively couple the various devices within the piconet. Some examples of the code allocations may be the code rates supported by the various PHY links, the modulation types (e.g., BPSK (Binary Phase Shift Key), QPSK (Quadrature Phase Shift Key), 16 QAM (16 Quadrature Amplitude Modulation), or other modulation types) supported by the various PHY links, or the various TFCs (time frequency codes) employed when modulating symbols across the various PHY links. In addition, other operational parameters may be assessed by the link quality intelligence gathering functionality of the PHYs of the devices within the piconet without departing from the scope and spirit of the invention.

The link quality intelligence gathering functionality of the PHYs of the devices may be employed to assess information (or gather intelligence) of 1 or more of the operational parameters described herein. The link quality intelligence gathering functionality of the PHYs of the devices may be directed by the corresponding MAC within that device. Alternatively, the link quality intelligence gathering functionality of the PHYs of the devices may be directed by the MAC of a single PNC within the piconet. Alternatively, the MACs of multiple PNCs may operate cooperatively to direct the PHYs of the DEVs to assess a particular group of operational parameters. If desired, individual PHYs of the devices may assess different operational parameters that correspond to the PHY links that communicatively couple to that particular device.

Figure 9:
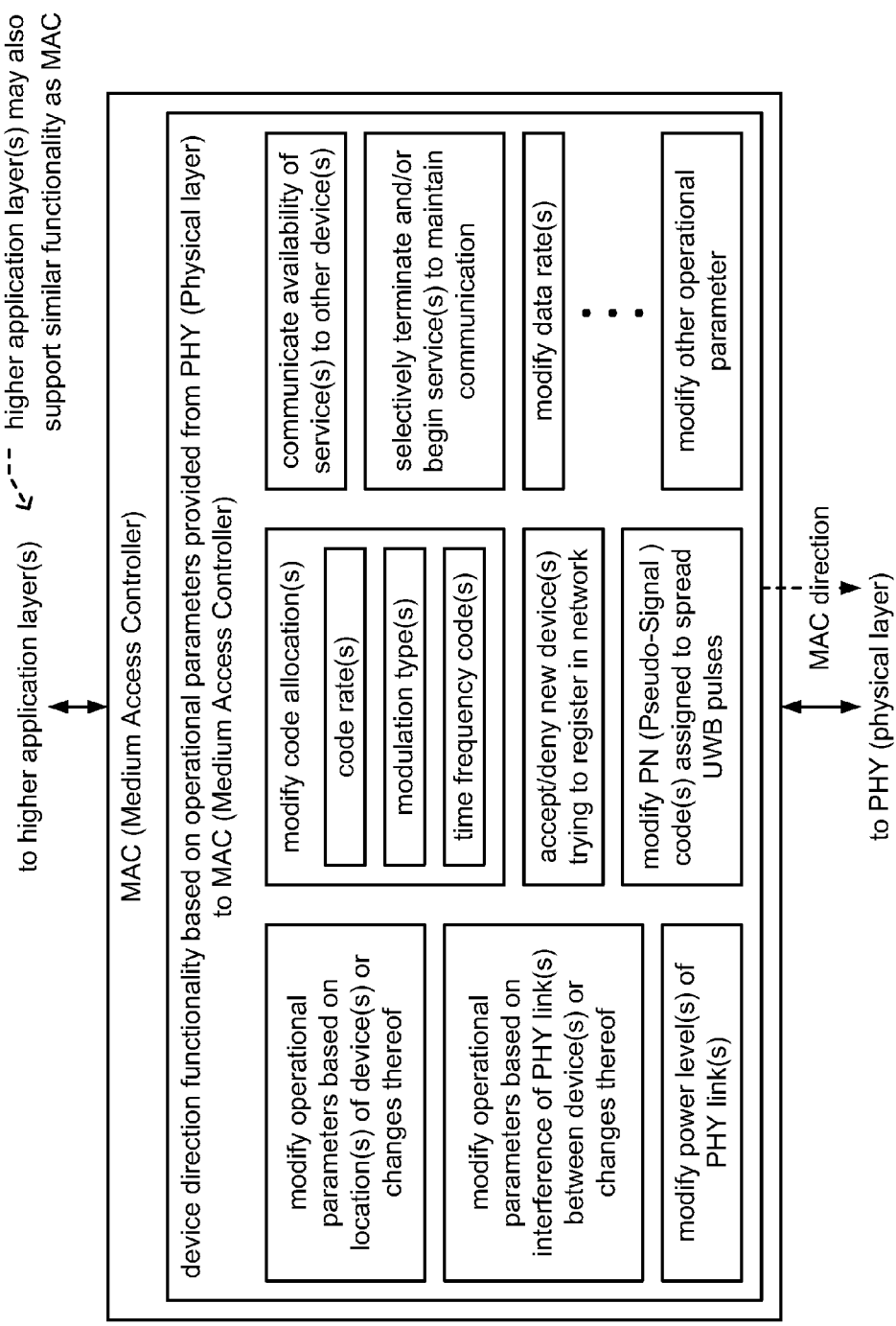
FIG. 9 is a diagram illustrating an embodiment of MAC (Medium Access Controller) directed device interaction that may be performed within a network according to the invention.

FIG. 9 is a diagram illustrating an embodiment of MAC (Medium Access Controller) directed device interaction that may be performed within a network according to the invention. The MAC described within this diagram may be viewed as being one of the MACs described above within the description of the FIG. 7 in one embodiment. The MAC herein includes device direction functionality that is able to direct the operation of the various PHYs of the devices within a piconet based on the operational parameters that are assessed and provided to the MAC from the PHY. The MAC in this embodiment shows one example of a higher layer protocol that is operable to direct the operation of the devices within the piconet based on the intelligence information provided by the PHYs. Again, the MAC implemented according to the invention may be viewed as being an enhanced (or modified) MAC when compared to MACs of the prior art. The MAC described herein is operable to employ this intelligence provided by the PHY and to process the intelligence for use in making appropriate modifications, when and if necessary, for the improved operation of the various PHY links that communicatively couple the devices within the piconet.

An example of a function that may be supported by the device direction functionality of the MAC may include modifying 1 or more of the operational parameters that govern the PHY links within a piconet. The device direction functionality of the MAC may modify the values of 1 or more of these operational parameters based on a change in any 1 or more of these operational parameters. One specific example of this modification functionality may include modifying 1 or more of the operational parameters based on a change in the interference of 1 or more of the PHY links; as an even more specific example, a modulation employed for a PHY links may be modified to provide a more robust modulation when the interference of a communication link increases thereby providing more secure communication between the devices.

As another example of the modification that may be performed by the device direction functionality of the MAC, the power level of signals transmitted across 1 or more of the PHY links may be modified by the MAC based on the intelligence provided by the PHY. The code allocations may also be modified; this may include modifying the code rate, the modulation type, and/or the TFC (time frequency code) that may be employed to govern communication across a PHY link.

Moreover, the MAC may employ its device direction functionality to accept or deny a registration request by a new device trying to register in the network. The MAC may also modify 1 or more of the PN code assignments that may be employed to spread OFDM pulses that are transmitted across a PHY link. After processing the intelligence information provided to the MAC by the PHY, the MAC may also communicate the availability of services that may be provided to the other devices. The MAC may selectively terminate a service and/or begin providing a service to another service in an effort to maintain communication to that device or to maintain a sufficient level of communication between the devices. The MAC may also modify the data rates employed for the signals transmitted across the PHY links. In addition, the MAC may be implemented to modify or direct other operational parameters as well without departing from the scope and spirit of the invention.

Also, any other of the higher protocol layers within the various devices may also include similar device direction functionality as described herein with respect to the MAC. For example, an application layer may perform device direction functionality based on intelligence provided by the PHY to the MAC. The MAC may perform some processing on this intelligence provided by the PHY, and 1 of the higher protocol layers may also perform some additional processing, as desired or necessary, to make decisions to direct the operation of the various devices within the network.

Figure 10:
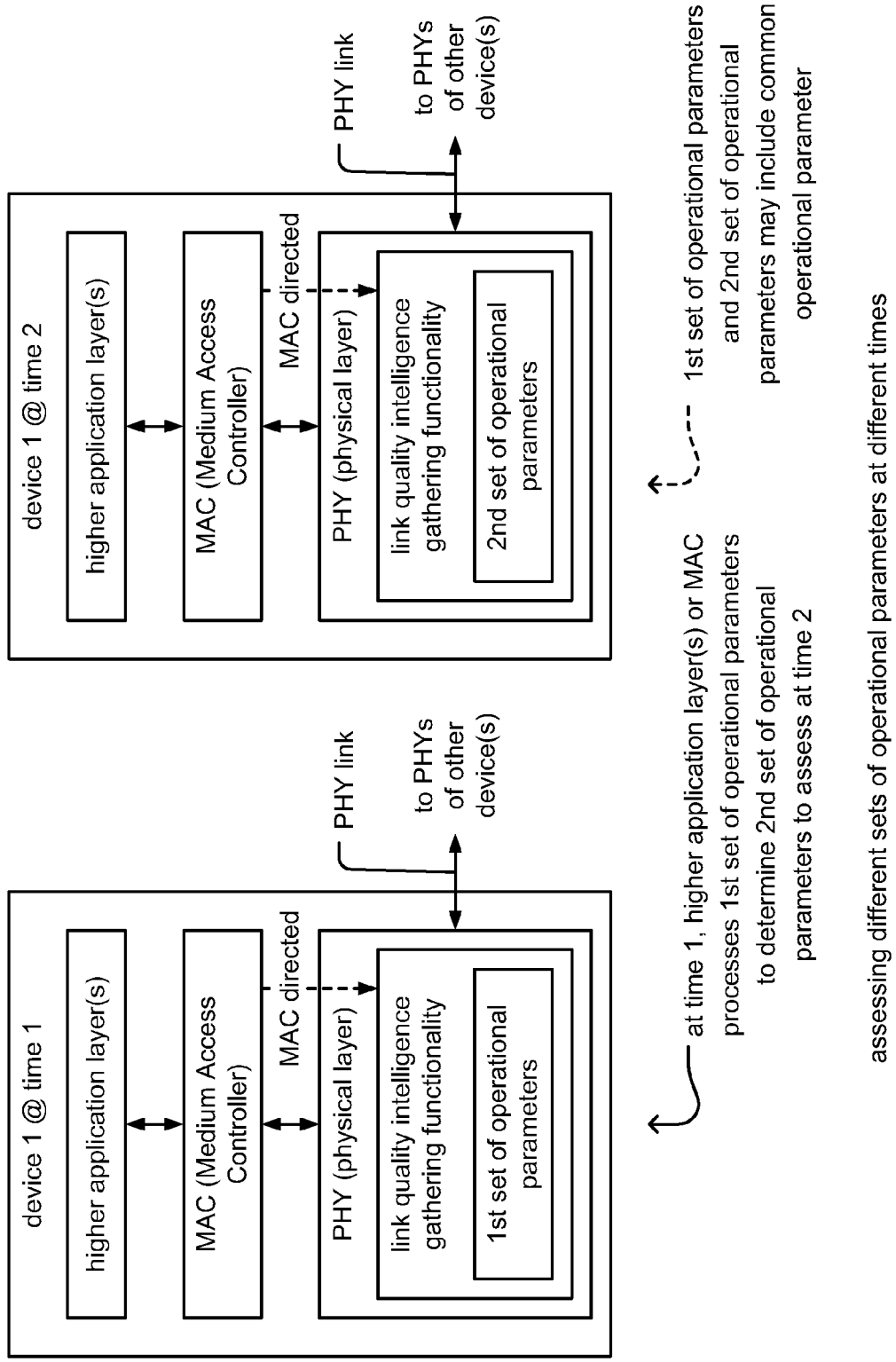
FIG. 10 is a diagram illustrating an embodiment of a PHY assessing different operational parameters of a PHY link at different times.

FIG. 10 is a diagram illustrating an embodiment of a PHY assessing different operational parameters of a PHY link at different times. This diagram shows how a PHY of a device may assess different sets of operational parameters at different times. For example, the PHY of the device may assess a $1^{st}$ set of operational parameters at a time 1, and the PHY of the device may assess a $2^{nd}$ set of operational parameters at a time 2. The $1^{st}$ set of operational parameters and the $2^{nd}$ set of operational parameters may include 1 or more operational parameters. This change in the operational parameters that are assessed by the PHY may be directed by the MAC or one of the higher protocol layers of the device (e.g., by an application layer in one embodiment).

This change in which operational parameters that are assessed by the PHY may be made based on a change of 1 or more of the operational parameters during operation of a piconet. Alternatively, the PHY of the device may assess the $1^{st}$ set of operational parameters during a $1^{st}$ time period, and then assess the $2^{nd}$ set of operational parameters during a $2^{nd}$ time period. A predetermined cycle of sets of operational parameters and time period may be employed that the PHY will assess. This changing of the sets of operational parameters that are assessed by the PHY may be performed in a predetermined manner, in some instances, without the direct involvement of the MAC. Then, in some embodiment, as the MAC monitors a change in 1 or more of the operational parameters of the PHY link, the MAC may then commence to be more directly involved in the management of the operational parameters that are assessed by the PHY. The MAC may switch in and out of this passive/active governing of the PHY in real time based on the particular values of the operational parameters of the PHY link.

Figure 11:
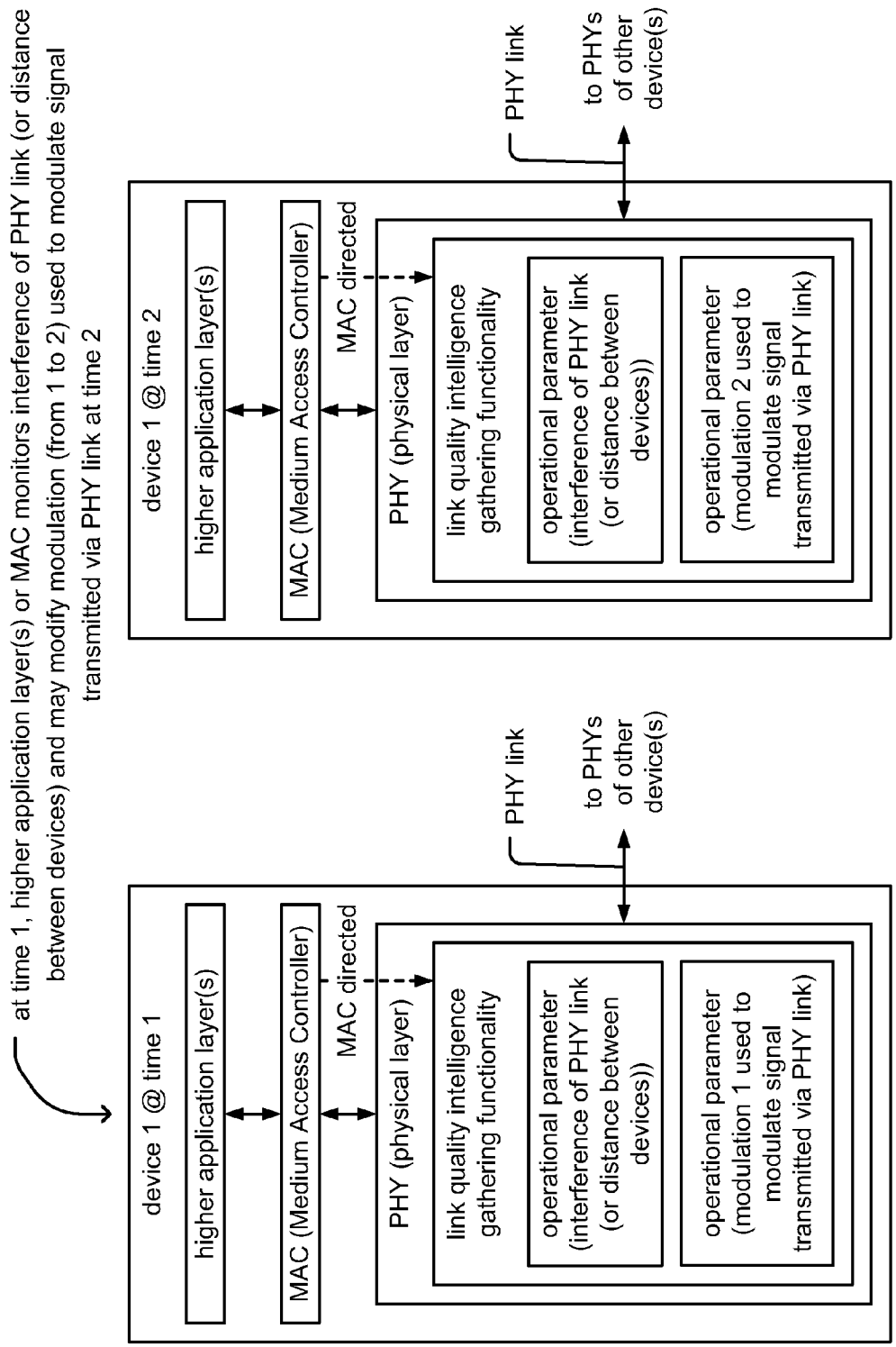
FIG. 11 is a diagram illustrating an embodiment of a device that employs a higher protocol layer to modify an operational parameter based on the change of another operational parameter according to the invention (shown modifying the modulation of the PHY link based on interference of the PHY link or the positions of the devices within the piconet).

FIG. 11 is a diagram illustrating an embodiment of a device that employs a higher protocol layer to modify an operational parameter based on the change of another operational parameter according to the invention (shown modifying the modulation of the PHY link based on interference of the PHY link or the positions of the devices within the piconet). This embodiment shows one of the many possible specific ways in which a higher protocol layer (e.g., the MAC or a higher application layer) may modulation the modulation employed for a PHY link from a $1^{st}$ modulation to a $2^{nd}$ modulation based on a change in a monitored operational parameter. Examples of the monitored operational parameter may be a change in the interference of the PHY link or a change in the position of 1 or more of the devices that are communicatively coupled by the PHY link.

In short, as the higher protocol layer (e.g., the MAC or a higher application layer) detects a change in one operational parameter, in this case the interference of the PHY link or the locations of the devices communicatively coupled by the PHY link, and based on the change of one of these operational parameters, the higher protocol layer (e.g., the MAC or the higher application layer) changes the modulation from a modulation 1 to a modulation 2. In the instance where the interference increases, a more robust modulation may be selected (e.g., modulation 2 more robust than modulation 1) such that the more robust modulation can accommodate the increased interference while still providing a high degree of performance.

Figure 12:
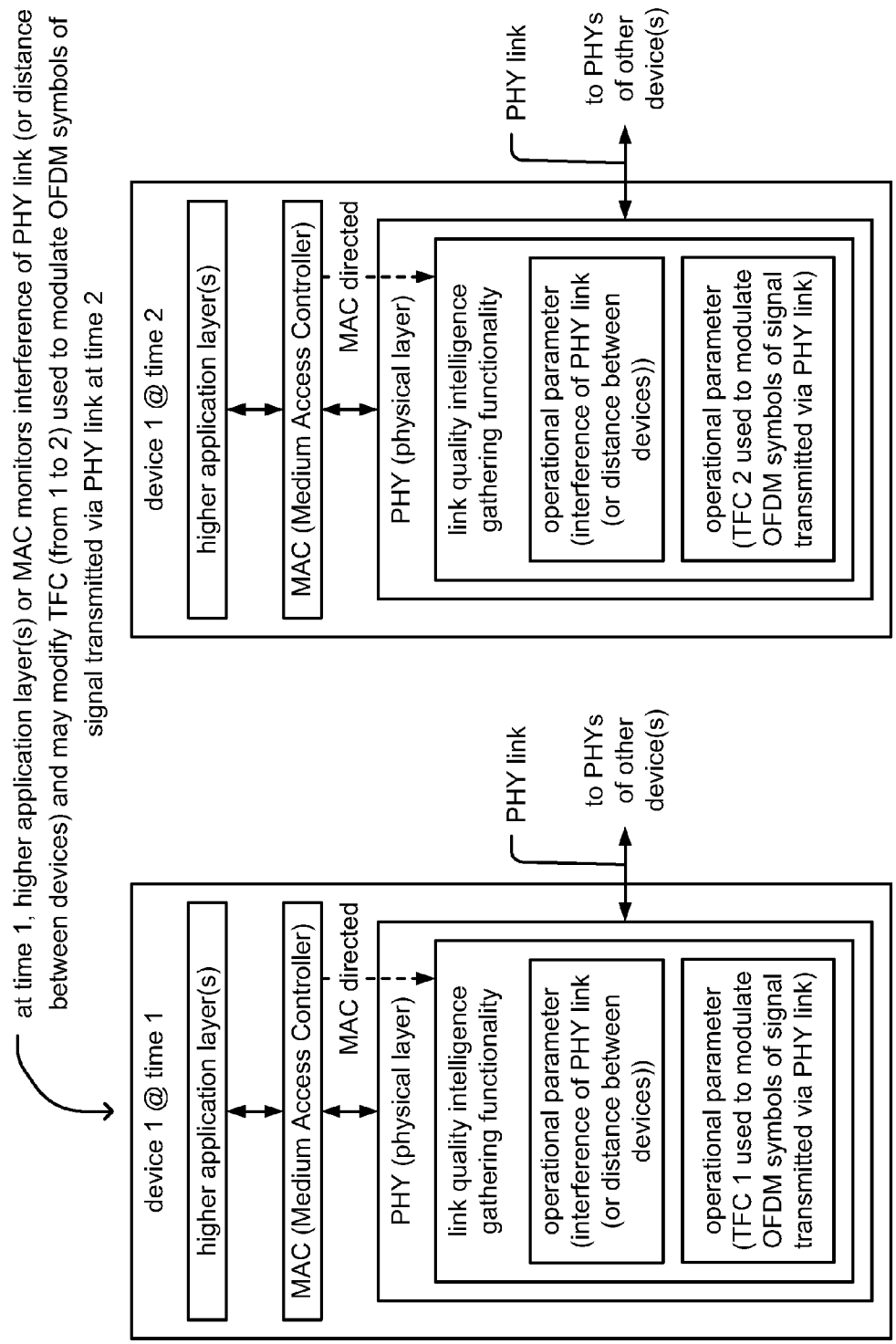
FIG. 12 is a diagram illustrating another embodiment of a device that employs a higher protocol layer to modify an operational parameter based on the change of another operational parameter according to the invention (shown modifying the TFC of the PHY link based on interference of the PHY link or the positions of the devices within the piconet).

FIG. 12 is a diagram illustrating another embodiment of a device that employs a higher protocol layer to modify an operational parameter based on the change of another operational parameter according to the invention (shown modifying the TFC (time frequency code) of the PHY link based on interference of the PHY link or the positions of the devices within the piconet). This embodiment shows one of the many possible specific ways in which a higher protocol layer (e.g., the MAC or a higher application layer) may modulation the modulation employed for a PHY link from a $1^{st}$ TFC to a $2^{nd}$ TFC based on a change in a monitored operational parameter. Examples of the monitored operational parameter may be a change in the interference of the PHY link or a change in the position of 1 or more of the devices that are communicatively coupled by the PHY link.

In short, as the higher protocol layer (e.g., the MAC or a higher application layer) detects a change in one operational parameter, in this case the interference of the PHY link or the locations of the devices communicatively coupled by the PHY link, and based on the change of one of these operational parameters, the higher protocol layer (e.g., the MAC or the higher application layer) changes the TFC employed for the PHY link from a TFC 1 to a TFC 2. In the instance where the interference increases, a different TFC may be selected (e.g., TFC 2 versus TFC 1) such that the different TFC can provide for better shielding than the previously used TFC thereby maintaining a high degree of performance. The TFCs are employed to spread the OFDM symbols that are transmitted across the PHY link.

These examples described within the FIG. 11 and the FIG. 12 are merely examples of some of the many possible examples of how an operational parameter may be appropriately modified according to the invention based on a particular value (or change thereof) of that operational parameter or another operational parameter. Clearly, any 1 or more of the operational parameters may be appropriately modified based on a value of 1 or more of the operational parameters or of a change thereof in accordance with invention.

Figure 13:
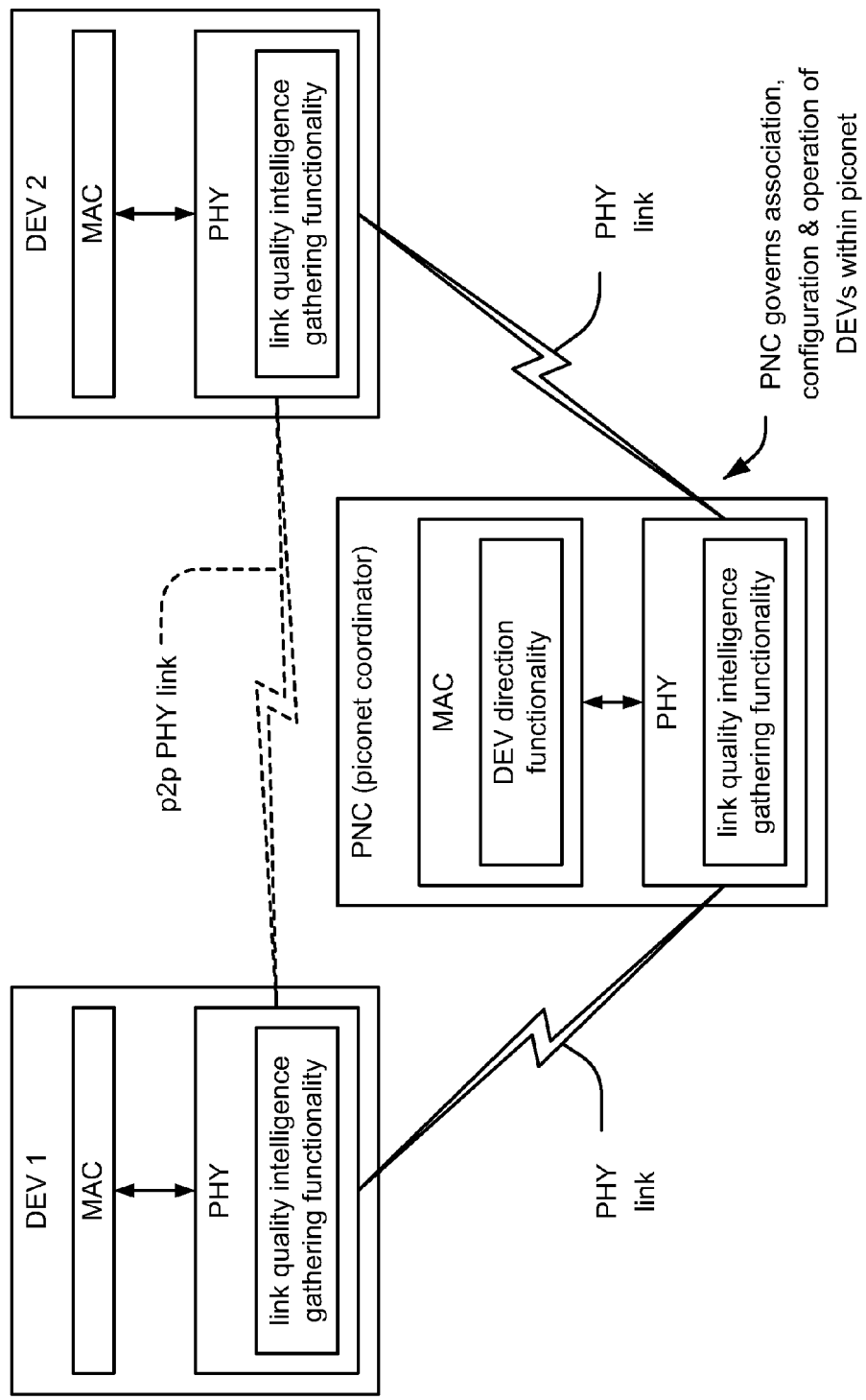
FIG. 13 is a diagram illustrating an embodiment PNC (piconet coordinator) direction operation of DEVs (user piconet devices) within a piconet according to the invention.

FIG. 13 is a diagram illustrating an embodiment PNC direction operation of DEVs (user piconet devices) within a piconet according to the invention. This diagram shows an embodiment of how a MAC of a PNC may include DEV direction functionality. Each DEV within the piconet includes a PHY that assesses operational parameters and provides intelligence corresponding thereto to the MAC of the respective DEV. Similarly, the PNC includes a PHY that assesses operational parameters and provides intelligence corresponding thereto to the MAC of the PNC. However, in this embodiment, the MAC of the PNC also includes DEV direction functionality that is operable to process intelligence corresponding to the various PHY links that communicatively couple to the PHY of the PNC and to direct each of the individual DEVs to modify their corresponding operational parameters, as desired and as necessary, to maintain a high level of performance across the various PHY links within the piconet.

In some instances, the MACs of the DEVs perform some processing of the intelligence provide thereto by the corresponding PHYs of the DEVs, and then the DEVs provide this processed information to the PNC so that the MAC of the PNC may employ this provided information, as well as information that the PHY of the PNC assesses independently to make any decisions regarding the operation of the various devices within the piconet (including the PNC and the DEVs).

In addition, the manner is which the PNC directs the operation of various PHY links that communicatively couple the PNC to the various DEVs within the piconet, the PNC may also direct the operation of the PHY links that communicatively couple any 2 DEVs that communicate via p2p (peer to peer) communication.

Clearly, the MAC of each DEV may also include similar DEV direction functionality that is used to direct the values of the various operational parameters that govern communication across the respective PHY links that communicatively couple to those specific DEVs. Such an embodiment may be viewed as a distributed embodiment where the DEV direction functionality is implemented within several devices whereas the FIG. 13 shows an example of a centralized embodiment where the PNC directs the operation of devices within the piconet (including the PNC itself and the DEVs).

Figure 14:
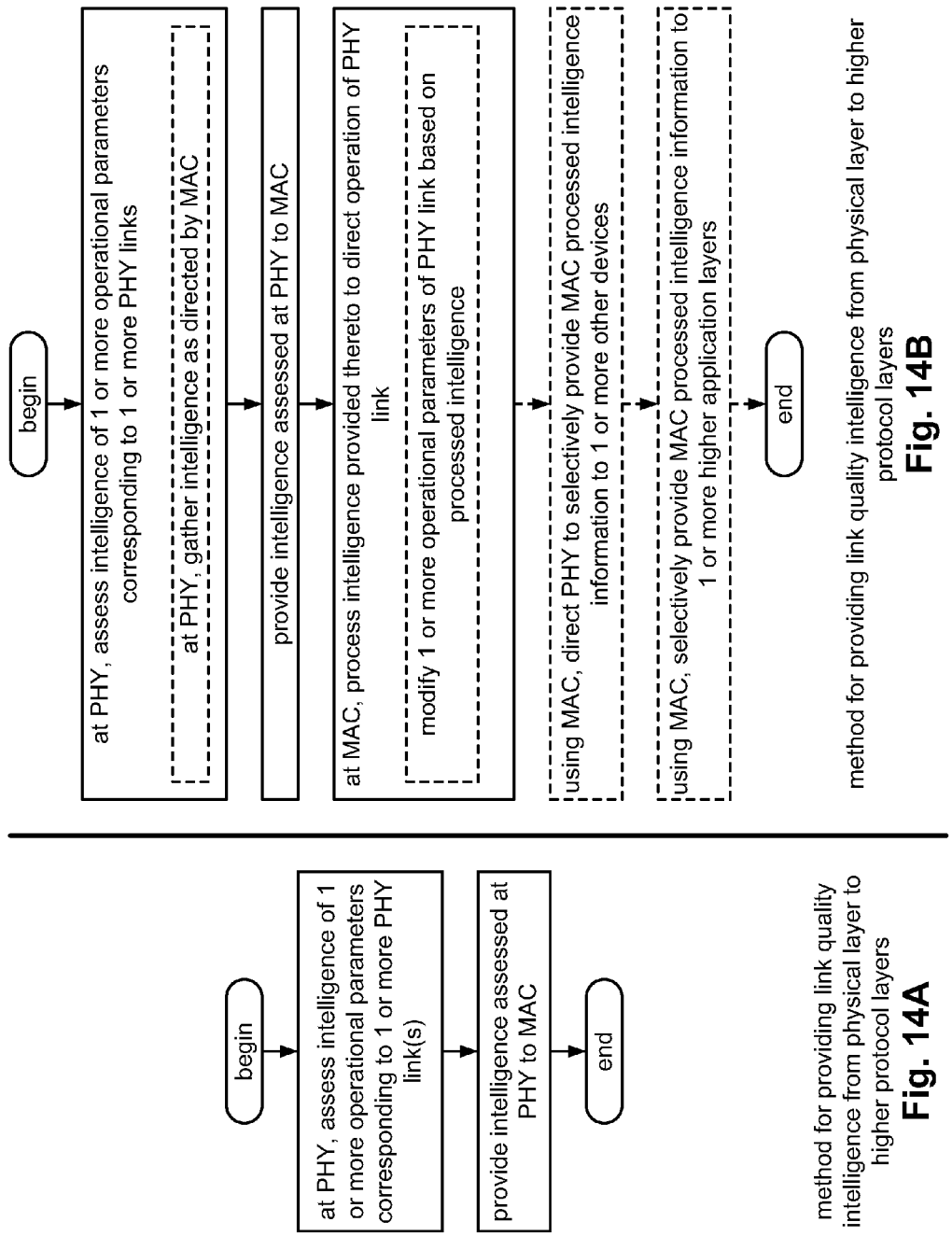
FIG. 14A and FIG. 14B are flowcharts illustrating various embodiments of methods for providing link quality intelligence from a PHY (physical layer) to higher protocol layers according to the invention.

FIG. 14A and FIG. 14B are flowcharts illustrating various embodiments of methods for providing link quality intelligence from a PHY (physical layer) to higher protocol layers according to the invention.

Referring to the FIG. 14A, this embodiment shows a relatively simple implementation of the invention. At the PHY of a device, the method operates to assess intelligence of 1 or more operational parameters that correspond to 1 or more PHY links that communicatively couple to the PHY of that device. The method then continues by providing the assessed intelligence from the PHY to a MAC of the device.

Referring to the FIG. 14B, this embodiment still shows a manner in which a PHY may assess intelligence of 1 or more operational parameters that correspond to 1 or more PHY links that communicatively couple to the PHY of that device as well as the providing of the assessed intelligence from the PHY to a MAC of the device.

Similar to the method described within the FIG. 14A, the method operates to assess intelligence of 1 or more operational parameters that correspond to 1 or more PHY links that communicatively couple to the PHY of that device. In some embodiments, the PHY may assess a particular set of operational parameters (or a single operational parameter) as directed by the MAC. Then, the method continues by providing the assessed intelligence from the PHY to a MAC of the device.

At the MAC, the method then continues by processing the intelligence provided by the PHY to direct the operation of the PHY link. Based on this processing, the MAC may direct perform modification of 1 or more of the operational parameters to govern future communication across the PHY link.

Subsequently, using the MAC of a first device, the method may continue by directing the first device's PHY to selectively provide the MAC processed intelligence to 1 or more other devices. In addition or alternatively, using the MAC of a first device, the method may continue by directing the MAC of the first device to selectively provide the MAC processed intelligence to 1 or more higher protocol layers within the first device; these 1 or more higher protocol layers may include 1 or more higher application layers.

Figure 15:
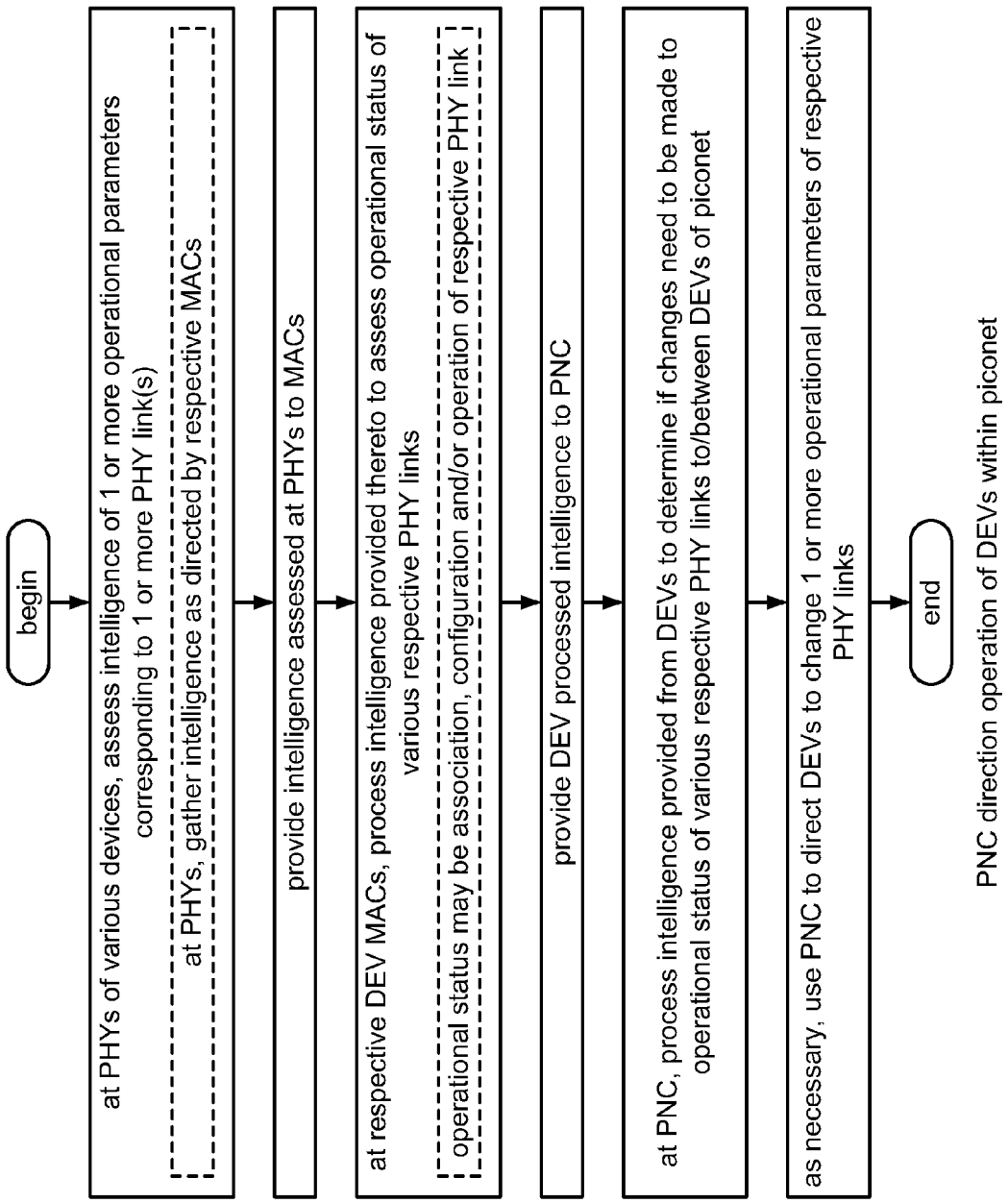
FIG. 15 is a flowchart illustrating an embodiment of a method that employs a PNC to direct the operation of DEVs within a piconet according to the invention.

FIG. 15 is a flowchart illustrating an embodiment of a method that employs a PNC to direct the operation of DEVs within a piconet according to the invention. This method of this embodiment shows how a centralized approach may be performed wherein a PNC processes information provided to it from its PHY (as well as information that may be provided to it from other devices) and directs the operation of the devices within a piconet.

Initially, at the PHYs of the various devices within a piconet, the method begins by assessing intelligence of the various PHY links that communicatively couple the various devices. This involves assessing intelligence corresponding to the operational parameters of the various PHYs links that communicatively couple all of the various devices; this also includes employing the PHY of the PNC to assess intelligence corresponding to the operational parameters of the various PHYs links that communicatively couple to the PNC. As with some of the other embodiments, the MACs of the various devices may direct the respective PHYs of the devices to assess particular operational parameters. In some embodiments, the MAC of the PNC operates cooperatively with the MACs of the DEVs to direct the respective PHYs of the devices to assess particular operational parameters.

The method then continues by providing the intelligence assessed at the PHYs the devices to the MACs of the devices. At the respective MACs of the DEVs, the assessed intelligence provided thereto by the respective PHYs is processed to assess the operational status of the PHY link. This operational status of the PHY link may be viewed as being the association, the configuration, and/or the operation of the corresponding PHY link. At a very minimum, the operational status of the PHY link corresponds to the values of the various operational parameters that govern the PHY link. After each of the MACs of the respective DEVs processes the intelligence provided by the respective PHYs, the method continues by providing this processed information from the various DEVs to the PNC.

At the PNC, the method continues by processing the information provided from the various DEVs to determine if any changes need to be made to the operational status of the various PHY links within the piconet. Then, as necessary, the method continues by using the PNC to direct the DEVs to change 1 or more of the operational parameters that govern the communication of the respective PHY links within the piconet.

It is also noted that the various methods described here within the FIG. 14A, FIG. 14B, and FIG. 15 may also be performed within the appropriate device and/or system embodiments described within other portions of this specification.

Moreover, while many of the embodiments described above are in the context of a piconet, it is also noted that various aspects of the invention may also be implemented within other types of communication systems as well. For example, devices implemented within wired (or wireline) communication systems may also benefit from the various aspects of the invention.

Various aspects of the invention can be found in a device that operates within a piconet. The device may be a PNC (piconet coordinator) or a DEV (user piconet device) DEV within the piconet in various embodiments. Alternatively, various aspects may also be fond in any communication device that performs the providing of link quality intelligence from a PHY (physical layer) to higher protocol layers therein (even within non-piconet types of communication systems as well).

In one such embodiment, a device includes a PHY (physical layer) that includes link quality intelligence gathering functionality. The device also includes a MAC (Medium Access Controller) that is communicatively coupled to the PHY. The link quality intelligence gathering functionality of the PHY is operable to assess a plurality of operational parameters that corresponds to a PHY link that communicatively couples the PHY of the device to a PHY of at least one additional device. The PHY of the device is operable to provide assessed information corresponding to the plurality of operational parameters to the MAC.

In certain embodiments, the MAC processes the assessed information corresponding to the plurality of operational parameters, and based on the processed assessed information, the MAC modifies at least one operational parameter of the plurality of operational parameters.

The MAC may be implemented to process the assessed information corresponding to the plurality of operational parameters. The device may also include a higher application layer, communicatively coupled to the MAC, that supports a first service. The MAC provides the processed assessed information to the higher application layer, and based on the processed assessed information provided to the higher application layer, the higher application layer terminates the first service to maintain communication between the device and the at least one additional device via the PHY link. The MAC may direct the link quality intelligence gathering functionality of the PHY to assess the plurality of operational parameters.

The in some other embodiments, the MAC directs the link quality intelligence gathering functionality of the PHY to assess a first plurality of operational parameters that is a subset of the plurality of operational parameters. The PHY of the device provides assessed information corresponding to the first plurality of operational parameters to the MAC, and the MAC processes the assessed information. Then, based on the processed assessed information, the MAC directs the link quality intelligence gathering functionality of the PHY to assess a second plurality of operational parameters that is a subset of the plurality of operational parameters. The first plurality of operational parameters and the second plurality of operational parameters include at least one common operational parameter. That is to say, 1 or more operational parameters of the first plurality of operational parameters and the second plurality of operational parameters may be the same operational parameter.

The PHY may also assess different operational parameters at different times as directed by the MAC of the device. For example, during a first time, the MAC directs the link quality intelligence gathering functionality of the PHY to assess a first plurality of operational parameters that is a subset of the plurality of operational parameters, and during a second time, the MAC directs the link quality intelligence gathering functionality of the PHY to assess a second plurality of operational parameters that is a subset of the plurality of operational parameters. Within this implementation as well, the first plurality of operational parameters and the second plurality of operational parameters include at least one common operational parameter.

In even other embodiments, the at least one additional device is a PNC (piconet coordinator), and the PHY of the at least one additional device is a PHY of the PNC. In such embodiments, the device is a DEV (user piconet device), and the PHY of the PNC includes link quality intelligence gathering functionality. The PNC also includes a MAC that is communicatively coupled to the PHY of the PNC. The MAC of the PNC includes DEV direction functionality. The link quality intelligence gathering functionality of the PHY of the PNC assesses at least one additional plurality of operational parameters that corresponds to the PHY link that communicatively couples the PHY of the DEV to the PHY of the PNC. The PHY of the PNC provides at least one additional assessed information corresponding to the at least one additional plurality of operational parameters to the MAC of the PNC.

In addition, the MAC of the PNC processes the at least one additional assessed information corresponding to the at least one additional plurality of operational parameters. The DEV may also transmit information corresponding to the PHY link from the DEV to the PNC. Thereafter, based on the processed at least one additional assessed information and based on the information corresponding to the PHY link that is transmitted from the PNC to the PNC, the DEV direction functionality of the PNC's MAC directs the DEV to change at least operational parameter of the plurality of operational parameters that corresponds to the PHY link that communicatively couples the PHY of the DEV to the PHY of the PNC. This may be viewed as the PNC directing 1 or more DEVs to modify the value of 1 or more of the operational parameters that governs communication to/from a DEV via a PHY link.

The various operational parameters assessed by the PHY may be any number of types of operational parameters. In some embodiments, a first operational parameter corresponds to the PHY link corresponds to a first modulation used to modulate a signal transmitted across the PHY link and a second operational parameter corresponds to an interference of the signal transmitted across the PHY link. The MAC processes the assessed information corresponding to the second operational parameter thereby monitoring the interference of the signal transmitted across the PHY link. Thereafter, based on a change in the interference of the signal transmitted across the PHY link, the MAC changes the first operational parameter from the first modulation to a second modulation, and the second modulation is subsequently used to modulate the signal transmitted across the PHY link.

Similar to the manner in which the modulation operational parameter may be modified from a $1^{st}$ modulation to a $2^{nd}$ modulation in response to a change in interference of a PHY link, a TFC (time frequency code) that is used to modulate OFDM (Orthogonal Frequency Division Multiplexing) symbols that are transmitted across the PHY link may also be modified in response to a change in interference. For example, based on a change in the interference of a signal transmitted across the PHY link, the MAC changes a first operational parameter from a first TFC to a second TFC, and the second TFC may be subsequently used to direct modulation of OFDM symbols of the signal transmitted across the PHY link. Moreover, the first operational parameter that is monitored and a change detected thereof may be something other than interference. The first operational parameter may correspond to a distance between the device and the at least one additional device. Then, based on a change in the distance between the device and the at least one additional device, the MAC changes the second operational parameter from a first modulation to a second modulation, and the second modulation is subsequently used to modulate the signal transmitted across the PHY link.

When a first device is providing a registration request to a second device, the MAC of the second device may process the assessed information corresponding to the PHY link between the first device and the second device. Then, based on the processed assessed information, the MAC of the second device may determine whether to accept or deny the registration request of the first device.

Again, there are a variety of operational parameters that correspond to a PHY link communicatively coupling two devices within a communication system (which may be a piconet in some instances). Some exemplary operational parameters are listed as follows: a distance between the device and the at least one additional device, a location of any of the devices within the piconet, interference of a signal transmitted across the PHY link, a data rate employed for a signal transmitted across the PHY link, a QoS (Quality of Service) of the PHY link, a SNR (Signal to Noise Ratio) of a signal transmitted across the PHY link, a PN (Pseudo-Noise) code assigned to spread UWB (Ultra Wide Band) pulses of a signal transmitted across the PHY link, a power level of a signal transmitted across the PHY link, a code rate of a signal transmitted across the PHY link, a modulation that modulates a signal transmitted across the PHY link, and a TFC that directs the modulation of OFDM (Orthogonal Frequency Division Multiplexing) symbols of a signal transmitted across the PHY link.

In view of the above detailed description of the invention and associated drawings, other modifications and variations will now become apparent. It should also be apparent that such other modifications and variations may be effected without departing from the spirit and scope of the invention.

What is claimed is:
1. An apparatus, comprising:
a physical layer (PHY) including link quality intelligence gathering functionality for assessing any of a plurality of operational parameters corresponding to a PHY link between the apparatus and at least one additional apparatus; and
a media access controller (MAC), directly coupled to the PHY, for adaptively directing the link quality intelligence gathering functionality of the PHY to assess respective subsets of the plurality of operational parameters corresponding to the PHY link.
2. The apparatus of claim 1, wherein:
the MAC processing a first subset of the plurality of operational parameters; and
based on the processed first subset of the plurality of operational parameters, the MAC directing the link quality intelligence gathering functionality to assess a second subset of the plurality of operational parameters.
3. The apparatus of claim 1, wherein:
the MAC processing a first operational parameter of the plurality of operational parameters; and
based on the processed first operational parameter of the plurality of operational parameters, the MAC directing the link quality intelligence gathering functionality to assess a second operational parameter of the plurality of operational parameters.
4. The apparatus of claim 1, wherein:
the MAC processing a first operational parameter of the plurality of operational parameters; and
based on the processed first operational parameter of the plurality of operational parameters, the MAC modifying at least one of the first operational parameter of the plurality of operational parameters and a second operational parameter of the plurality of operational parameters.
5. The apparatus of claim 1, wherein:
during a first time, the MAC directing the link quality intelligence gathering functionality to assess a first subset of the plurality of operational parameters; and
during a second time, the MAC directing the link quality intelligence gathering functionality to assess a second subset of the plurality of operational parameters.
6. The apparatus of claim 1, wherein:
the first subset of the plurality of operational parameters or the second subset of the plurality of operational parameters includes all of the plurality of operational parameters.
7. The apparatus of claim 1, wherein:
a first subset of the plurality of operational parameters and a second subset of the plurality of operational parameters respectively include at least one common operational parameter.
8. The apparatus of claim 1, wherein:
the apparatus employing orthogonal signaling for communication with the at least one additional apparatus via the PHY link.
9. The apparatus of claim 8, wherein:
the orthogonal signaling corresponding to signaling employing a time frequency code (TFC), code division multiple access (CDMA) signaling, or orthogonal frequency division multiplexing (OFDM) signaling.
10. The apparatus of claim 1, wherein:
the apparatus being a DEV (user piconet device); and
the at least one additional apparatus being a PNC (piconet coordinator).

11. The apparatus of claim 1, wherein:
an operational parameter of the plurality of operational parameters corresponding to at least one of:
a distance between the apparatus and the at least one additional apparatus;
a location of the apparatus;
a location of the at least one additional apparatus;
interference of a signal transmitted via the PHY link;
a data rate of a signal transmitted via the PHY link;
a QoS (Quality of Service) of the PHY link;
a SNR (Signal to Noise Ratio) of a signal transmitted via the PHY link;
a PN (Pseudo-Noise) code employed to spread UWB (Ultra Wide Band) pulses of a signal transmitted via the PHY link;
a power level of a signal transmitted via the PHY link;
a code rate of a signal transmitted via the PHY link;
a modulation of a signal transmitted via the PHY link; and
a TFC (time frequency code) that modulates OFDM (Orthogonal Frequency Division Multiplexing) symbols of a signal transmitted via the PHY link.

12. An apparatus, comprising:
a physical layer (PHY) including link quality intelligence gathering functionality for assessing a first subset of a plurality of operational parameters corresponding to a PHY link supporting orthogonal signaling for communication between the apparatus and at least one additional apparatus; and
a media access controller (MAC), directly coupled to the PHY, for processing the first subset of the plurality of operational parameters; and wherein:
based on the processed first subset of the plurality of operational parameters, the MAC adaptively directing the link quality intelligence gathering functionality to assess a second subset of the plurality of operational parameters.

13. The apparatus of claim 12, wherein:
the first subset of the plurality of operational parameters or the second subset of the plurality of operational parameters includes all of the plurality of operational parameters.

14. The apparatus of claim 12, wherein:
a first subset of the plurality of operational parameters and a second subset of the plurality of operational parameters respectively include at least one common operational parameter.

15. The apparatus of claim 12, wherein:
the orthogonal signaling corresponding to signaling employing a time frequency code (TFC), code division multiple access (CDMA) signaling, or orthogonal frequency division multiplexing (OFDM) signaling.

16. The apparatus of claim 12, wherein:
the apparatus being a DEV (user piconet device); and
the at least one additional apparatus being a PNC (piconet coordinator).

17. The apparatus of claim 12, wherein:
an operational parameter of the plurality of operational parameters corresponding to at least one of:
a distance between the communication device and the at least one additional communication device;
a location of the communication device;
a location of the at least one additional communication device;
interference of a signal transmitted via the PHY link;
a data rate of a signal transmitted via the PHY link;
a QoS (Quality of Service) of the PHY link;
a SNR (Signal to Noise Ratio) of a signal transmitted via the PHY link;
a PN (Pseudo-Noise) code employed to spread UWB (Ultra Wide Band) pulses of a signal transmitted via the PHY link;
a power level of a signal transmitted via the PHY link;
a code rate of a signal transmitted via the PHY link;
a modulation of a signal transmitted via the PHY link; and
a TFC (time frequency code) that modulates OFDM (Orthogonal Frequency Division Multiplexing) symbols of a signal transmitted via the PHY link.

18. A method for operating a communication device, the method comprising:
employing link quality intelligence gathering functionality, included within a physical layer (PHY) of the communication device, for assessing any of a plurality of operational parameters corresponding to a PHY link between the communication device and at least one additional communication device; and
employing a media access controller (MAC), directly coupled to the PHY, for adaptively directing the link quality intelligence gathering functionality of the PHY to assess respective subsets of the plurality of operational parameters corresponding to the PHY link.

19. The method of claim 18, wherein:
employing the MAC for processing a first subset of the plurality of operational parameters; and
based on the processed first subset of the plurality of operational parameters, employing the MAC for directing the link quality intelligence gathering functionality to assess a second subset of the plurality of operational parameters.

20. The method of claim 18, further comprising:
employing the MAC for processing a first operational parameter of the plurality of operational parameters; and
based on the processed first operational parameter of the plurality of operational parameters, employing the MAC for directing the link quality intelligence gathering functionality to assess a second operational parameter of the plurality of operational parameters.

21. The method of claim 18, further comprising:
employing the MAC for processing a first operational parameter of the plurality of operational parameters; and
based on the processed first operational parameter of the plurality of operational parameters, employing the MAC for modifying at least one of the first operational parameter of the plurality of operational parameters and a second operational parameter of the plurality of operational parameters.

22. The method of claim 18, further comprising:
during a first time, employing the MAC for directing the link quality intelligence gathering functionality to assess a first subset of the plurality of operational parameters; and
during a second time, employing the MAC for directing the link quality intelligence gathering functionality to assess a second subset of the plurality of operational parameters.

23. The method of claim 18, wherein:
a first subset of the plurality of operational parameters and a second subset of the plurality of operational parameters respectively include at least one common operational parameter.

24. The method of claim 18, further comprising:
employing orthogonal signaling for communication with the at least one additional communication device via the PHY link.

25. The method of claim 24, wherein:
the orthogonal signaling corresponding to signaling employing a time frequency code (TFC), code division multiple access (CDMA) signaling, or orthogonal frequency division multiplexing (OFDM) signaling.

26. The method of claim 18, wherein:
an operational parameter of the plurality of operational parameters corresponding to at least one of:
a distance between the communication device and the at least one additional communication device;
a location of the communication device;
a location of the at least one additional communication device;
interference of a signal transmitted via the PHY link;
a data rate of a signal transmitted via the PHY link;
a QoS (Quality of Service) of the PHY link;
a SNR (Signal to Noise Ratio) of a signal transmitted via the PHY link;
a PN (Pseudo-Noise) code employed to spread UWB (Ultra Wide Band) pulses of a signal transmitted via the PHY link;
a power level of a signal transmitted via the PHY link;
a code rate of a signal transmitted via the PHY link;
a modulation of a signal transmitted via the PHY link; and
a TFC (time frequency code) that modulates OFDM (Orthogonal Frequency Division Multiplexing) symbols of a signal transmitted via the PHY link.

\* \* \* \* \*